United States Patent
Uchiyama et al.

(10) Patent No.: US 12,176,998 B2
(45) Date of Patent: Dec. 24, 2024

(54) COMMUNICATION APPARATUS AND COMMUNICATION METHOD

(71) Applicant: Sony Group Corporation, Tokyo (JP)

(72) Inventors: Hiromasa Uchiyama, Tokyo (JP); Naoki Kusashima, Kanagawa (JP); Yifu Tang, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 411 days.

(21) Appl. No.: 17/534,457

(22) Filed: Nov. 24, 2021

(65) Prior Publication Data

US 2022/0085876 A1 Mar. 17, 2022

Related U.S. Application Data

(63) Continuation of application No. 16/608,189, filed as application No. PCT/JP2018/009518 on Mar. 12, 2018, now Pat. No. 11,218,216.

(30) Foreign Application Priority Data

May 2, 2017 (JP) .................................. 2017-091852

(51) Int. Cl.
*H04W 4/70* (2018.01)
*H04B 7/26* (2006.01)
(Continued)

(52) U.S. Cl.
CPC ............ *H04B 7/2606* (2013.01); *H04W 4/70* (2018.02); *H04W 24/10* (2013.01); *H04W 72/02* (2013.01); *H04W 76/14* (2018.02); *H04W 88/04* (2013.01)

(58) Field of Classification Search
CPC ... H04B 7/2606; H04B 7/15542; H04W 4/70; H04W 24/10; H04W 72/02; H04W 76/14; H04W 88/04
See application file for complete search history.

(56) References Cited

U.S. PATENT DOCUMENTS

2009/0147706 A1 6/2009 Yu et al.
2014/0029507 A1* 1/2014 Dimou ................ H04W 72/541
370/315

(Continued)

FOREIGN PATENT DOCUMENTS

WO 2016/019620 A1 2/2016
WO 2017/026970 A1 2/2017

(Continued)

OTHER PUBLICATIONS

International Search Report and Written Opinion mailed on May 22, 2018 for PCT/JP2018/009518 filed on Mar. 12, 2018, 22 pages pages including English Translation of the International Search Report.

(Continued)

*Primary Examiner* — Edan Orgad
*Assistant Examiner* — Malick A Sohrab
(74) *Attorney, Agent, or Firm* — XSENSUS LLP

(57) ABSTRACT

[Subject]
To realize FeD2D communication with higher quality.
[Solving Means]
A communication apparatus includes: an acquisition unit that acquires, from another apparatus, information regarding a state of communication through a resource pool allocated to wireless links between at least part of a plurality of relay communication apparatuses, which are movable, and a remote communication apparatus; and a control unit that individually controls allocation of the resource pool to each of the wireless links between each of the plurality of relay communication apparatuses and the remote communication apparatus associated with the relay communication apparatus on the basis of the acquired information.

4 Claims, 28 Drawing Sheets

(51) Int. Cl.
*H04W 24/10* (2009.01)
*H04W 72/02* (2009.01)
*H04W 76/14* (2018.01)
*H04W 88/04* (2009.01)

(56) References Cited

U.S. PATENT DOCUMENTS

| | | | |
|---|---|---|---|
| 2015/0172846 A1* | 6/2015 | Ge | H04W 8/005 |
| | | | 370/254 |
| 2015/0215903 A1 | 7/2015 | Zhao | |
| 2015/0223217 A1 | 8/2015 | Chen et al. | |
| 2016/0286374 A1 | 9/2016 | Baghel | |
| 2017/0013598 A1 | 1/2017 | Jung | |
| 2017/0027011 A1 | 1/2017 | Chae | |
| 2017/0055282 A1* | 2/2017 | Sadiq | H04W 74/08 |
| 2017/0094657 A1 | 3/2017 | Yoon | |
| 2017/0215098 A1 | 7/2017 | Huang et al. | |
| 2017/0325267 A1 | 11/2017 | Zhu et al. | |
| 2018/0054804 A1 | 2/2018 | Luo et al. | |
| 2018/0069664 A1 | 3/2018 | Khoryaev et al. | |
| 2018/0092017 A1* | 3/2018 | Freda | H04W 76/23 |
| 2018/0152915 A1 | 5/2018 | Kalhan | |
| 2018/0213577 A1 | 7/2018 | Burbidge et al. | |
| 2019/0028906 A1 | 1/2019 | Chen et al. | |
| 2019/0028947 A1* | 1/2019 | Adachi | H04W 36/08 |
| 2019/0357177 A1 | 11/2019 | Kuang et al. | |
| 2020/0107178 A1* | 4/2020 | Chae | H04W 72/0446 |
| 2020/0288511 A1 | 9/2020 | Burbidge et al. | |
| 2020/0296738 A1 | 9/2020 | Inokuchi et al. | |
| 2020/0344708 A1 | 10/2020 | Liao | |

FOREIGN PATENT DOCUMENTS

| | | |
|---|---|---|
| WO | 2017/026977 A1 | 2/2017 |
| WO | WO-2017078783 A1 * | 5/2017 |

OTHER PUBLICATIONS

Intel Corporation, "Considerations on Sidelink Communication Enhancements for Wearable and IoT Use Cases", 3GPP TSG RAN1 WG Meeting No. 88bis, R1-1704706, Spokane, USA, Apr. 3-7, 2017, pp. 1-7.

Qualcomm Incorporated, "Communication and UE-to-NW relaying aspects", 3GPP TSG RAN WG1 Meeting No. 88Bis, R1-1705030, Spokane, USA, Apr. 3-7, 2017, 2 pages.

Huawei et al., "Discussion on enhancement on communication", 3GPP TSG RAN WG1 Meeting No. 88bis, R1-1704308, Spokane, USA, Apr. 3-7, 2017, 3 pages.

Catr, "Discussions on L3-based UE-to-Network Relays communication procedure", 3GPP TSG RAN WG2 Meeting No. 91, R1-153488, Beijing, China, Aug. 24-28, 2015, 13 pages.

LG Electronics Inc., "Discovery and connection establishment procedure", 3GPP TSG-RAN WG2 Meeting No. 95bis, R2-168779, Reno, USA, Nov. 14-18, 2016, pp. 1-7.

European Communication issued Feb. 6, 2020 in European Application No. 18793739.6.

EricssonUE Feedbacks for V2X3GPP TSG-RAN WG2#93bis R2-1628133GPP2016.04.01.

Intel CorporationDetails of congestion control for V2V communicatio3GPP TSG-RAN WG1#88 R1-17021423GPP2017.02.07.

Intel CorporationOn Carrier Aggregation for LTE V2V Sidelink Communication3GPP TSG-RAN WG1#88b R1-17054463GPP2017.03.25.

Lenovo, Motorola MobilityDiscussion on resource pool design for 3GPP V2X Phase 23GPP TSG-RAN WG1#88b R1-17056563GPP2017.03.25.

SonySidelink Enhancements.3GPP TSG-RAN WG2#97bis R2-17032753GPP2017.03.24.

Intel Corporation, On D2D Resource Allocation Modes and In/Edge/Out of Coverage Definition, 3GPP TSG-RAN WG1#77 R1-142018, May 19-23, 2014.

Intel Corporation, Physical layer enhancements for D2D-aided IoT and wearable scenarios, 3GPP TSG RAN WG1 #88 R1-1702175, Feb. 13-17, 2017.

Sony, Discussion on synchronization aspects of feD2D, 3GPP TSG RAN WG1 #88b R1-1705935, Apr. 3-7, 2017.

Sony Sidelink enhancements; R2 1703275 feD2D 3GPP TSG RAN WG2 Meeting #97bis 20170325 Full text.

* cited by examiner

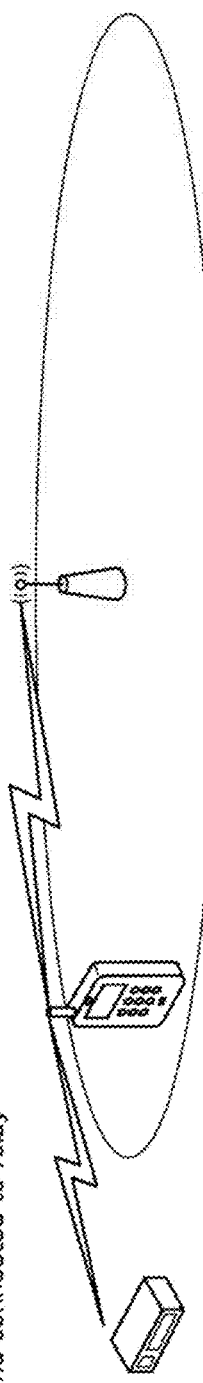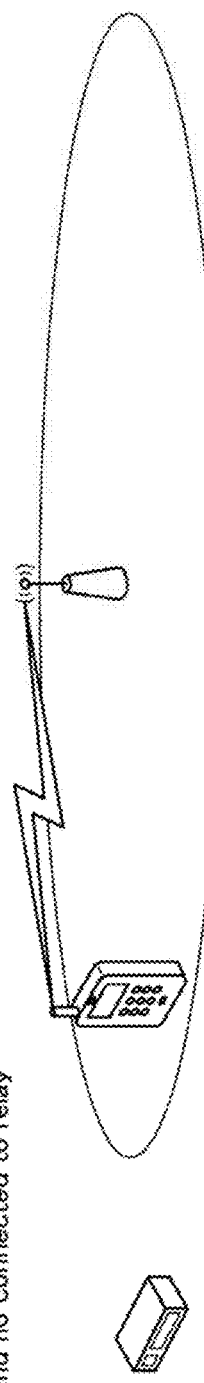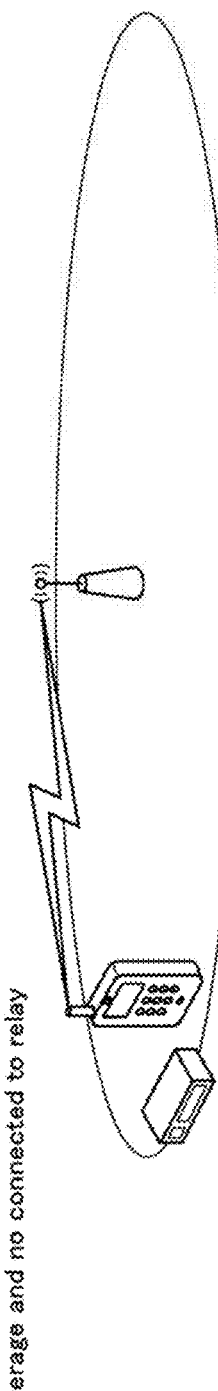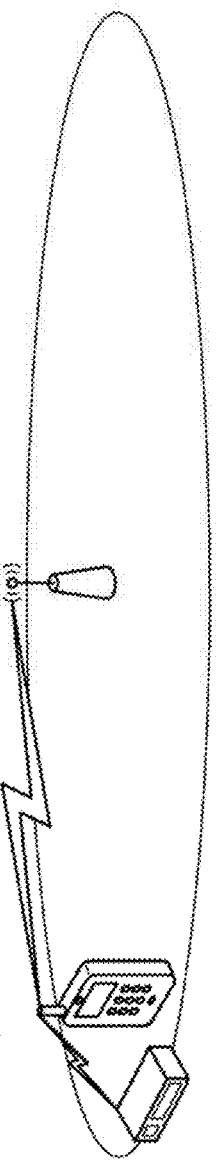
FIG. 5
Scenario 1 : OOC and connected to relay
Scenario 2 : OOC and no connected to relay
Scenario 3 : In coverage and no connected to relay
Scenario 4 : In coverage and connected to relay

COMMUNICATION APPARATUS AND COMMUNICATION METHOD

CROSS-REFERENCE TO RELATED APPLICATIONS

This application is a continuation of U.S. application Ser. No. 16/608,189, filed Oct. 25, 2019, which is based on PCT filing PCT/JP2018/009518, filed Mar. 12, 2018, and claims priority to Japanese Application No. 2017-091852, filed May 2, 2017, the entire contents of each are incorporated herein by reference.

TECHNICAL FIELD

The present disclosure relates to a communication apparatus and a communication method.

BACKGROUND ART

In recent years, research and development are actively conducted in relation to IoT (Internet of Things). In the IoT, various things are connected to a network to exchange information, and wireless communication is an important technical theme. Therefore, communication for IoT, such as MTC (Machine Type Communication) and NB-IoT (Narrow Band IoT), is standardized in 3GPP (Third Generation Partnership Project). Particularly, communication with low power consumption is important in a low-cost terminal for IoT, and future enhancement is anticipated.

A representative example of the low-cost terminal includes a wearable terminal. In the wearable terminal, communication with low power consumption and high reliability is desirable, and communication with high capacity is desirable in some cases. To cover such a use case, standardization of FeD2D (Further enhancement D2D) is started in the 3GPP in 2016. The wearable terminal usually exists around the user. Therefore, relay communication can be applied by using a user terminal, such as a smartphone, as a relay communication apparatus. In this way, the communication distance can be reduced to realize communication with low power consumption and high reliability. Note that techniques related to the FeD2D are disclosed in Non Patent Literature 1 to 3.

CITATION LIST

Non Patent Literature

[NPL 1]
Intel Corporation, "Considerations on Sidelink Communication Enhancements for Wearable and IoT Use Cases," R1-1704706, Apr. 3-7, 2017
[NPL 2]
Qualcomm Incorporated, "Communication and UE-to-NW relaying aspects," R1-1705030, Apr. 3-7, 2017
[NPL 3]
Huawei, HiSilicon, "Discussion on enhancement on communication," R1-1704308, Apr. 3-7, 2017

SUMMARY

Technical Problems

In the relay communication for a so-called remote communication apparatus, such as a wearable terminal, it is important to guarantee end-to-end communication quality (QoS) between a base station and the remote communication apparatus, and establishment of a highly reliable communication path is desirable. In addition, for example, a wearable terminal or the like is expected to be used as a remote communication apparatus, and communication with low complexity, low cost, and low power consumption is desirable.

Therefore, the present disclosure proposes a technique that can realize FeD2D communication with higher quality.

Solution to Problems

The present disclosure provides a communication apparatus including: an acquisition unit that acquires, from another apparatus, information regarding a state of communication through a resource pool allocated to wireless links between at least part of a plurality of relay communication apparatuses, which are movable, and a remote communication apparatus; and a control unit that individually controls allocation of the resource pool to each of the wireless links between each of the plurality of relay communication apparatuses and the remote communication apparatus associated with the relay communication apparatus on the basis of the acquired information.

In addition, the present disclosure provides a communication apparatus including: a notification unit that notifies a base station of information regarding a state of communication through a resource pool allocated to a wireless link to a remote communication apparatus; and a control unit that controls communication through the wireless link to the remote communication apparatus on the basis of a resource pool allocated to the wireless link by the base station after the notification of the information, the resource pool allocated separately from another wireless link between another relay communication apparatus and another remote communication apparatus.

In addition, the present disclosure provides a communication apparatus which is movable, the communication apparatus including: a control unit that relays communication between at least part of a plurality of remote communication apparatuses and a base station; an acquisition unit that acquires, from at least part of the plurality of remote communication apparatuses, information regarding states of communication with the remote communication apparatuses through wireless links; and a notification unit that notifies, through the base station, the plurality of remote communication apparatuses of a response according to an acquisition result of the information.

In addition, the present disclosure provides a communication apparatus including: a notification unit that notifies a relay communication apparatus, which is movable, of information regarding a state of communication through a wireless link to the relay communication apparatus; and an acquisition unit that acquires, through a base station, a response to the information transmitted by the relay communication apparatus to a plurality of remote communication apparatuses associated with the relay communication apparatus.

In addition, the present disclosure provides a communication apparatus which is movable, the communication apparatus including: a control unit that relays communication between a remote communication apparatus and a base station; and a state acquisition unit that acquires information regarding a state of a first wireless link to the base station, in which the control unit performs control to transmit a discovery signal to the remote communication apparatus through at least part of a plurality of sub-resource pools allocated to a second wireless link to the remote communication apparatus according to the acquired information.

In addition, the present disclosure provides a communication apparatus including: an acquisition unit that acquires, from a base station, information regarding at least part of a plurality of sub-resource pools allocated to a second wireless link to a relay communication apparatus, which is movable, according to a state of a first wireless link between the relay communication apparatus and the base station; and a control unit that performs control to receive a discovery signal transmitted from the relay communication apparatus through at least part of the plurality of sub-resource pools according to an acquisition status of the information.

In addition, the present disclosure provides a communication method executed by a computer, the communication method including: acquiring, from another apparatus, information regarding a state of communication through a resource pool allocated to wireless links between at least part of a plurality of relay communication apparatuses, which are movable, and a remote communication apparatus; and individually controlling allocation of the resource pool to each of the wireless links between each of the plurality of relay communication apparatuses and the remote communication apparatus associated with the relay communication apparatus on the basis of the acquired information.

In addition, the present disclosure provides a communication method executed by a computer, the communication method including: notifying a base station of information regarding a state of communication through a resource pool allocated to a wireless link to a remote communication apparatus; and controlling communication through the wireless link to the remote communication apparatus on the basis of a resource pool allocated to the wireless link by the base station after the notification of the information, the resource pool allocated separately from another wireless link between another relay communication apparatus and another remote communication apparatus.

In addition, the present disclosure provides a communication method executed by a computer which is movable, the communication method including: relaying communication between at least part of a plurality of remote communication apparatuses and a base station; acquiring, from at least part of the plurality of remote communication apparatuses, information regarding states of communication with the remote communication apparatuses through wireless links; and notifying, through the base station, the plurality of remote communication apparatuses of a response according to an acquisition result of the information.

In addition, the present disclosure provides a communication method executed by a computer, the communication method including: notifying a relay communication apparatus, which is movable, of information regarding a state of communication through a wireless link to the relay communication apparatus; and acquiring, through a base station, a response to the information transmitted by the relay communication apparatus to a plurality of remote communication apparatuses associated with the relay communication apparatus.

In addition, the present disclosure provides a communication method executed by a computer which is movable, the communication method including: relaying communication between a remote communication apparatus and a base station; acquiring information regarding a state of a first wireless link to the base station; and performing control to transmit a discovery signal to the remote communication apparatus through at least part of a plurality of sub-resource pools allocated to a second wireless link to the remote communication apparatus according to the acquired information.

In addition, the present disclosure provides a communication method executed by a computer, the communication method including: acquiring, from a base station, information regarding at least part of a plurality of sub-resource pools allocated to a second wireless link to a relay communication apparatus, which is movable, according to a state of a first wireless link between the relay communication apparatus and the base station; and performing control to receive a discovery signal transmitted from the relay communication apparatus through at least part of the plurality of sub-resource pools according to an acquisition status of the information.

Advantageous Effect of Invention

As described above, according to the present disclosure, a technique that can realize FeD2D communication with higher quality can be provided.

Note that the advantageous effect may not be limited, and any of the advantageous effects illustrated in the present specification or other advantageous effects that can be understood from the present specification may be attained in addition to the advantageous effect or in place of the advantageous effect.

BRIEF DESCRIPTION OF DRAWINGS

FIG. 5 is a diagram illustrating an example of coverage scenarios that can be expected in FeD2D.

DESCRIPTION OF EMBODIMENTS

Hereinafter, preferred embodiments of the present disclosure will be described in detail with reference to the attached drawings. Note that in the present specification and the drawings, the same reference signs are provided to the constituent elements with substantially the same functional configurations, and the description will not be repeated.

Note that the description will be made in the following order.

1. Introduction
   1.1. Overall Configuration
   1.2. Request Regarding Relay Communication
   1.3. Use Cases
   1.4. Coverage Scenarios
   1.5. Relay Types
   1.6. Expected Traffic
   1.7. Definition
   1.8. Configuration Example of Each Apparatus
      1.8.1. Configuration Example of Base Station
      1.8.2. Configuration Example of Relay UE
      1.8.3. Configuration Example of Remote UE
2. First Embodiment
   2.1. Technical Problem
   2.2. Technical Features
   2.3. Evaluation
3. Second Embodiment
   3.1. Technical Problem
   3.2. Technical Features
   3.3. Evaluation
4. Third Embodiment
   4.1. Technical Problem
   4.2. Technical Features
   4.3. Evaluation
5. Application Examples
   5.1. Application Example Regarding Base Station
   5.2. Application Example Regarding Terminal Apparatus
6. Conclusion

1. Introduction

1.1. Overall Configuration

Figure 1:
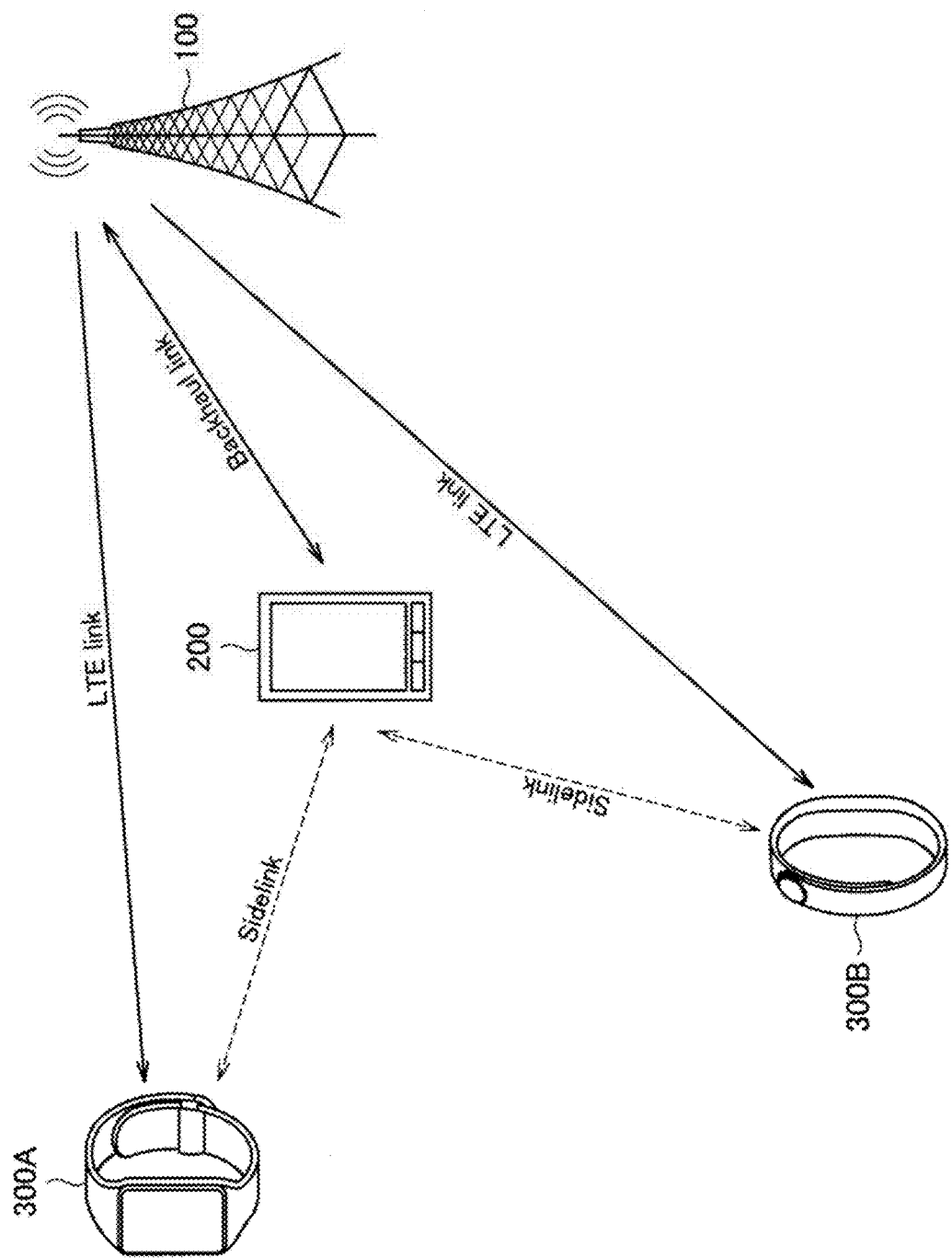
FIG. 1 is a diagram for describing an example of a configuration of a system according to an embodiment of the present disclosure.

FIG. 1 is a diagram for describing an example of a configuration of a system 1 according to an embodiment of the present disclosure. As illustrated in FIG. 1, the system 1 according to the present embodiment includes a base station 100, a terminal apparatus 200, and terminal apparatuses 300 (for example, terminal apparatuses 300A and 300B).

The base station 100 operates a cell and provides wireless services to one or more terminal apparatuses positioned inside the cell. For example, the base station 100 provides wireless services to each of the terminal apparatuses 200 and 300. The cell can be operated according to, for example, an arbitrary wireless communication system, such as 4G, 5G, LTE, and NR (New Radio).

The terminal apparatus 200 and the terminal apparatuses 300 wirelessly communicate with the base station 100 based on control by the base station 100. The terminal apparatus 200 and the terminal apparatuses 300 may be so-called user terminals (UE: User Equipment). The terminal apparatus 200 and the terminal apparatuses 300 form links (for example, downlinks or uplinks) to the base station 100. In addition, the terminal apparatus 200 and the terminal apparatuses 300 transmit uplink signals to the base station 100 and receive downlink signals from the base station 100. In this way, the communication with the base station 100 without involvement of another apparatus will also be referred to as "direct communication."

Here, the terminal apparatus 200 is a movable relay communication apparatus with a function of delivering (that is, relaying) communication from another apparatus or to another apparatus. For example, the terminal apparatus 200 can relay communication between the base station 100 and the terminal apparatus 300. In other words, the base station 100 can communication with the terminal apparatus 300 through the relay of communication by the terminal apparatus 200. Specifically, the terminal apparatus 200 receives an uplink signal for the base station 100 from the terminal apparatus 300 and forwards the uplink signal to the base station 100. The terminal apparatus 200 receives a downlink signal for the terminal apparatus 300 from the base station 100 and forwards the downlink signal to the terminal apparatus 300. In this way, the communication with the base station 100 through another apparatus will also be referred to as "relay communication." The terminal apparatus 300 can use the relay communication to perform communication with lower power consumption than typically the direct communication. The link formed between the terminal apparatus 200 and the terminal apparatus 300 is also called a sidelink. In addition, the link formed between the base station 100 and the terminal apparatus 200 is also called a backhaul link. Note that although one terminal apparatus 200 relays the relay communication in the example illustrated in FIG. 1, two or more terminal apparatuses 200 may relay the relay communication.

Hereinafter, the movable terminal apparatus 200 with a relay function will also be referred to as a relay terminal or relay UE, and the terminal apparatus 300 that performs communication through the relay UE 200 will also be referred to as a remote terminal or remote UE. The remote UE 300 is, for example, an IoT device that performs less frequent communication. In addition, the remote UE 300 may also be a smartphone, an in-vehicle terminal, a drone, or the like. Similarly, the relay UE 200 can also be realized as, for example, an apparatus dedicated to relay, an IoT device, a smartphone, an in-vehicle terminal, a drone, or the like.

An example of an apparatus similar to the relay UE includes a relay base station. The relay base station is standardized by 3GPP so far. Hereinafter, differences between the relay base station and the relay UE will be described.

First, there is a difference regarding the mobility. The position of the relay base station is fixed. On the other hand, the relay UE has mobility.

Second, there is a difference regarding the owner. The relay base station is usually property of an operator, and the relay base station operates with authority equivalent to the base station. On the other hand, the relay UE is usually property of a user, and the relay UE may operate with limited authority compared to the relay base station. For example, the relay UE may operate under the management of the base station.

Third, there is a difference regarding the expected use case. The relay base station is expected to provide relay communication to a smartphone. On the other hand, the relay UE is expected to provide relay communication to an MTC terminal, an NB-IoT terminal, and the like in addition to the smartphone, and the relay UE needs to support various types of communication traffic including small packet data.

Fourth, there is a difference regarding the deployment of the remote UE. In the relay base station, the remote UE is expected to be uniformly distributed in the coverage. On the other hand, the remote UE may not be uniformly distributed in the relay UE.

1.2. Request Regarding Relay Communication

A representative example of an IoT terminal that uses the relay communication (in other words, low-cost terminal) includes a wearable terminal. In the wearable terminal, communication with low power consumption and high reliability is desirable, and communication with high capacity is desirable in some cases. To cover such a use case, standardization of FeD2D (Further enhancement D2D) is started in 3GPP in 2016. The wearable terminal is usually positioned around the user. Therefore, relay communication using a user terminal, such as a smartphone, as a relay communication apparatus (relay UE) can be applied to reduce the communication distance of the wearable terminal to realize highly reliable communication with low power consumption.

In the relay communication for a so-called remote communication apparatus (remote UE), such as a wearable terminal, it is important to guarantee end-to-end communication quality (QoS) between the base station and the remote communication apparatus, and establishment of a highly reliable communication path is desirable. In addition, for example, a wearable terminal or the like can be used as a remote communication apparatus, and communication with low complexity, low cost, and low power consumption is desirable. To realize these, realization of the following requirements is desirable.

A first requirement is an improvement of sidelink communication. Closed loop feedback communication for retransmission and the like is not performed in the sidelink. However, to satisfy the first requirement, it is desirable to support functions, such as link adaptation and HARQ (Hybrid automatic repeat request) using feedback, to realize, for example, communication with QoS and high reliability.

A second requirement is reduced power consumption. To satisfy the second requirement, it is desirable to support, for example, functions such as transmission power control and DRX (Discontinuous Reception).

A third requirement is service continuity. The link quality dynamically changes in relation to the remote communication apparatus such as a wearable terminal. Therefore, to satisfy the third requirement, it is desirable to support functions, such as optimization of handover and path switching.

1.3. Use Cases

Various use cases are expected in the relay communication using a wearable terminal as a remote communication apparatus. For example, FIGS. 2 and 3 are diagrams illustrating examples of communication environments expected in the relay communication using a wearable terminal as a remote communication apparatus.

Figure 2:
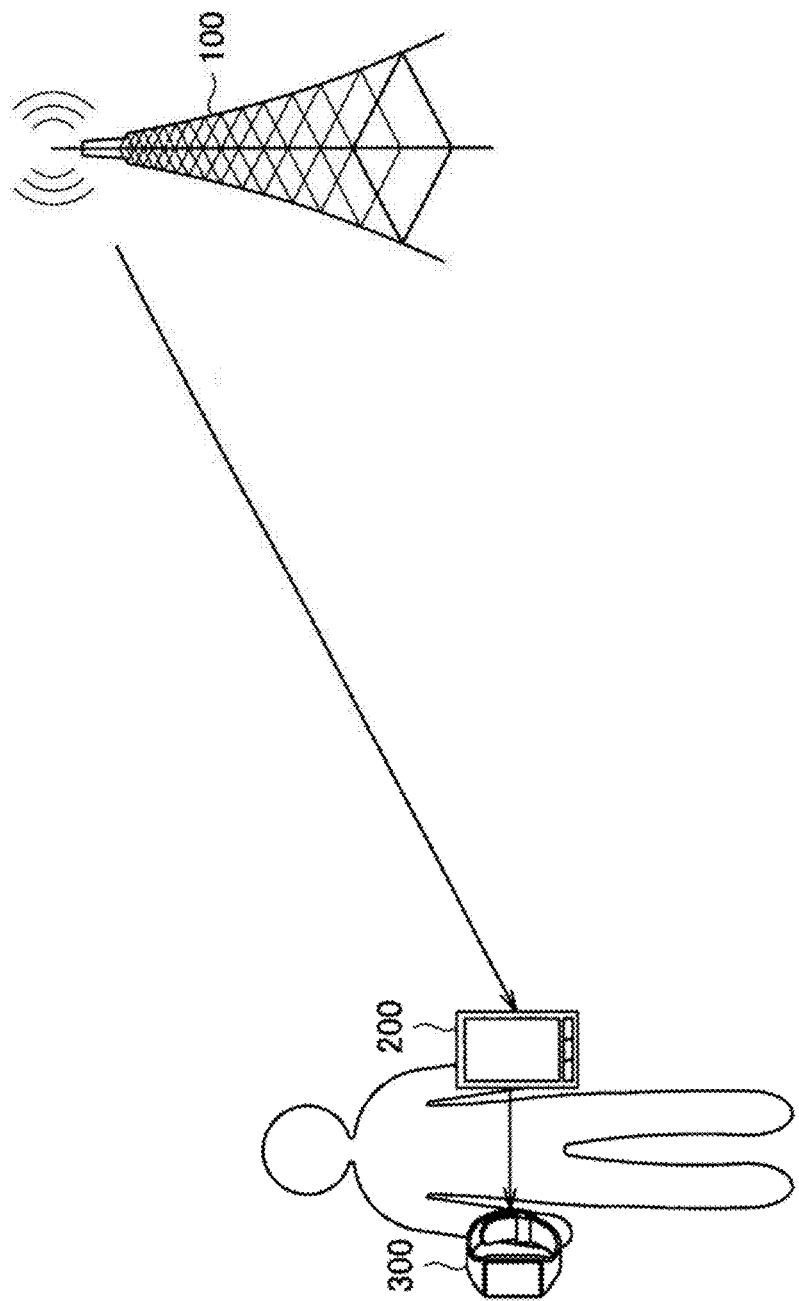
FIG. 2 is a diagram illustrating an example of a communication environment expected in relay communication using a wearable terminal as a remote communication apparatus.
Figure 3:
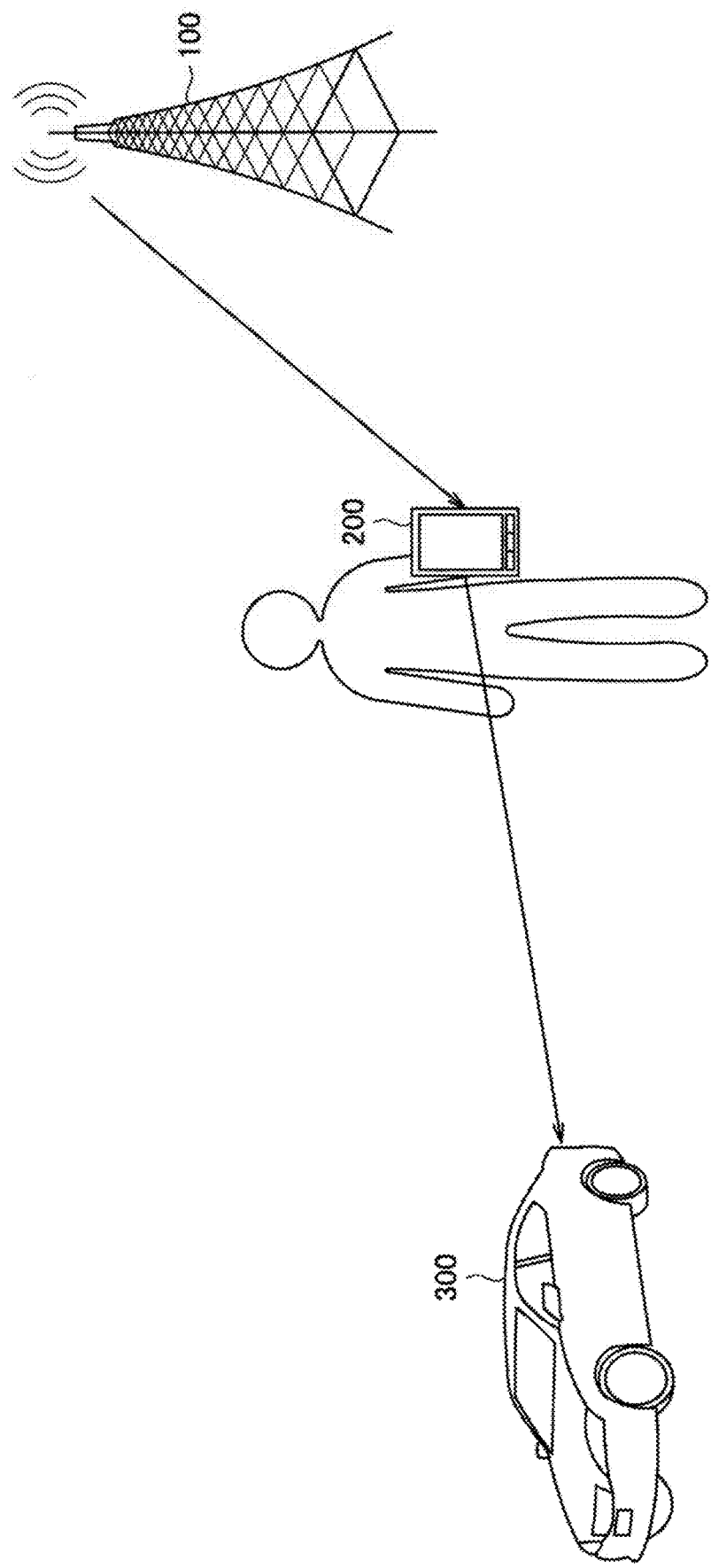
FIG. 3 is a diagram illustrating an example of the communication environment expected in the relay communication using the wearable terminal as the remote communication apparatus.

Specifically, two communication environments are expected, including an environment of short range communication as illustrated in FIG. 2 and an environment of wide range communication as illustrated in FIG. 3. In general, the user holds the terminal apparatus in the expected case of wearable (short range communication). However, the wearable may not be technically limited to the wearable situation. That is, the relay communication can also be realized in an environment in which the user does not hold part of the terminal apparatus. Therefore, it is desirable to similarly support the relay communication in the wide range communication as illustrated in FIG. 3, in addition to the short range communication as illustrated in FIG. 2.

Figure 4:
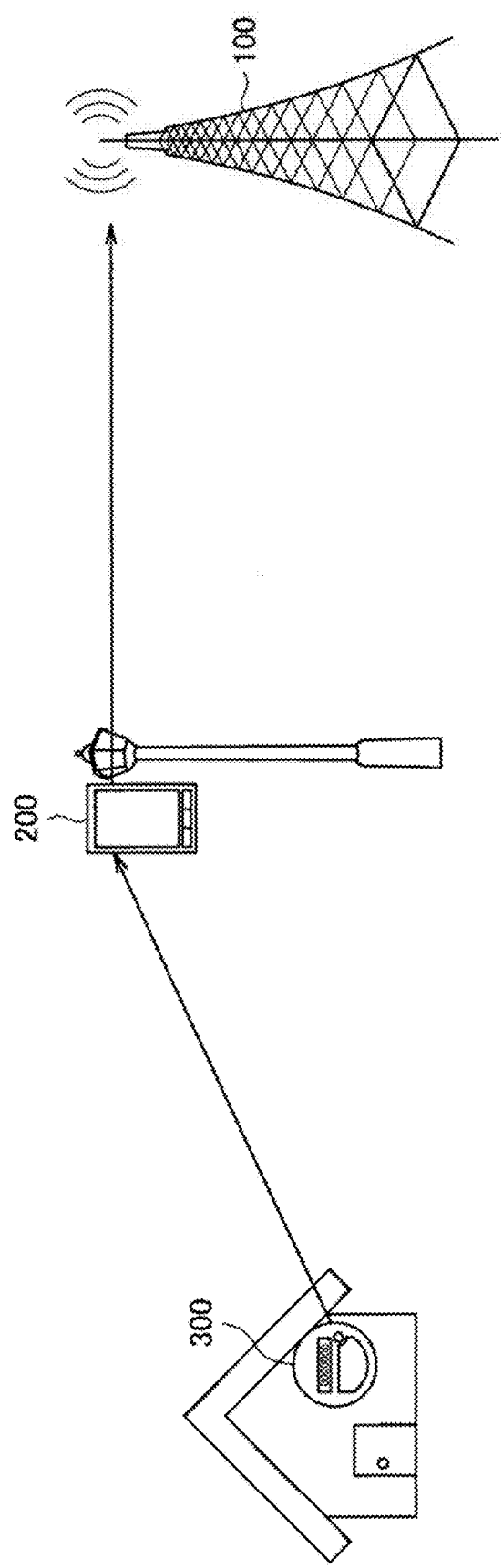
FIG. 4 is a diagram illustrating an example of a use case of MTC.

In addition, FIG. 4 is a diagram illustrating an example of a use case of MTC, and for example, FIG. 4 illustrates an example of a case in which an MTC terminal, such as a smart meter, installed in a house is applied as a remote communication apparatus. That is, as illustrated in FIG. 4, the smart meter can transmit data through the relay communication apparatus, instead of directly transmitting the data to the base station. Note that in this case, the relay communication apparatus may be fixed or may have mobility. In this way, the relay communication through the relay communication apparatus can realize the reduced power consumption in the remote communication apparatus.

1.4. Coverage Scenarios

Next, coverage scenarios of FeD2D will be described. For example, FIG. 5 is a diagram illustrating an example of coverage scenarios that can be expected in the FeD2D. As illustrated in FIG. 5, scenarios of four patterns can be expected according to whether the remote communication apparatus is within the range of the base station and according to whether the connection is established between the relay communication apparatus and the remote communication apparatus.

Examples of main use cases that can be expected in the FeD2D include in-coverage scenarios as indicated by Scenarios 3 and 4 in FIG. 5. That is, the remote communication apparatus can connect to the relay communication apparatus in the environment in which the connection to the base station is established, and the power consumption in the uplink transmission can be reduced.

Furthermore, as indicated by Scenarios 1 and 2 in FIG. 5, out-of-coverage scenarios can also be expected, in which the remote communication apparatus is positioned outside the range of the base station. In the use cases of the wearable terminal, the distance between the base station and the relay communication apparatus and the distance between the base station and the remote communication apparatus are basically the same. However, due to the difference in antenna configuration or the like, there may be a case in which the remote communication apparatus is out-of-coverage even though the remote communication apparatus and the relay communication apparatus are at the same position. Therefore, it is also desirable to support the cases in which the remote communication apparatus is out-of-coverage.

1.5. Relay Types

Figure 6:
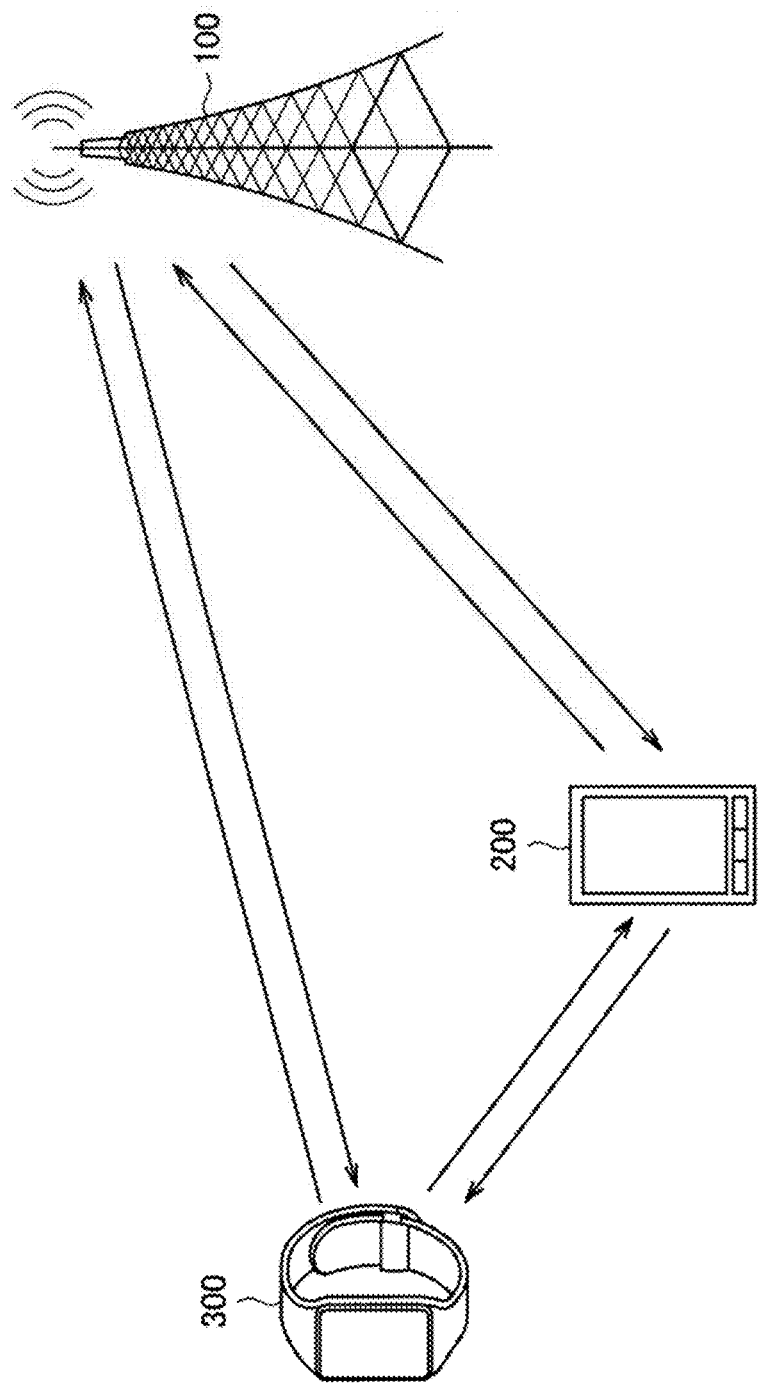
FIG. 6 is an explanatory view for describing a relay type in the FeD2D.
Figure 7:
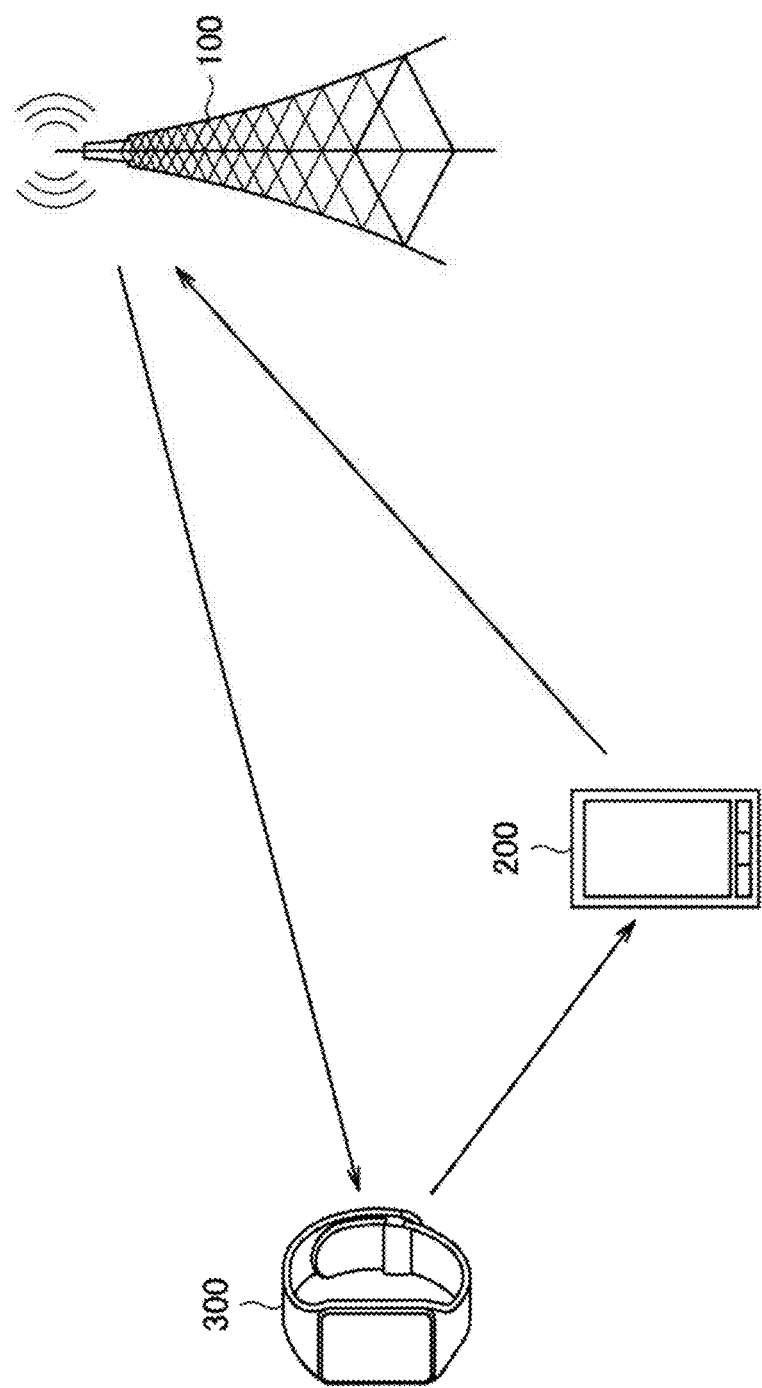
FIG. 7 is an explanatory view for describing a relay type in the FeD2D.

Next, relay types in the FeD2D will be described. FIGS. 6 and 7 are explanatory views for describing relay types in the FeD2D. The relay types in the FeD2D can be classified into a case of bidirectional relay illustrated in FIG. 6 and a case of unidirectional relay as illustrated in FIG. 7 according to whether the remote communication apparatus has reception capability in the sidelink.

As illustrated in FIG. 6, the DL signal (downlink signal) from the base station can be transmitted to the remote communication apparatus through the relay communication apparatus in the case of bidirectional relay. In this case, the remote communication apparatus needs to receive the signal of sidelink, and a receiver of SC-FDMA with a waveform of sidelink needs to be separately provided.

On the other hand, as illustrated in FIG. 7, the DL signal is directly transmitted from the base station to the remote communication apparatus, and only the UL signal (uplink signal) is transmitted from the remote communication apparatus to the base station through the relay communication apparatus in the case of unidirectional relay. That is, in the case of unidirectional relay, the receiver of SC-FDMA is not necessary for the remote communication apparatus, and the cost can be reduced as compared to the case of bidirectional relay.

In this way, it is desirable to support these relay types in the case where the FeD2D is applied.

1.6. Expected Traffic

An example of another feature in the operation environment includes traffic. Examples of the terminal expected to be used as a remote communication apparatus include a terminal that requires a high data rate and a terminal that communicates a very small amount of data packets, such as when unlocking the key of a car. Under the circumstances, it is desirable to support a wide variety of amounts of traffic.

1.7. Definition

For describing the technique according to the present disclosure, the definition of a sub-resource pool and a sub-resource pool group will be described.

The sub-resource pool is a resource pool provided according to a limitation on the bandwidth that can be received by the remote communication apparatus, and the sub-resource pool is set to include one or more resources. In a specific example, resources equivalent to 6 RBs are allocated to the sub-resource pool in the frequency direction. The relay communication apparatus may allocate the resources from the sub-resource pool to the remote communication apparatus managed by the relay communication apparatus. Note that the unit of resources allocated as a sub-resource pool group may be appropriately changed according to the reception capability of the apparatus expected to be used as a remote communication apparatus.

The sub-resource pool group is equivalent to resource pools allocated to individual relay communication apparatuses among a plurality of relay communication apparatuses managed as a group. The sub-resource pool group may include one or more sub-resource pools. The sub-resource pool group is allocated to each relay communication apparatus by, for example, the base station. In this case, the relay communication apparatus may allocate, to the remote communication apparatus managed by the relay communication apparatus, the resources from, for example, the sub-resource pools included in the sub-resource pool group allocated to the relay communication apparatus.

Note that the sub-resource pools may be allocated by the base station or may be allocated by the relay communication apparatus. Specifically, the base station may allocate, as sub-resource pools, at least part of the sub-resource pool group allocated to each relay communication apparatus. Furthermore, in another example, the relay communication apparatus may allocate, as sub-resource pools, at least part of the sub-resource pool group allocated from the base station.

1.8. Configuration Example of Each Apparatus

Next, an example of a configuration of each apparatus in the system according to an embodiment of the present disclosure will be described.

<1.8.1. Configuration Example of Base Station>

Figure 8:
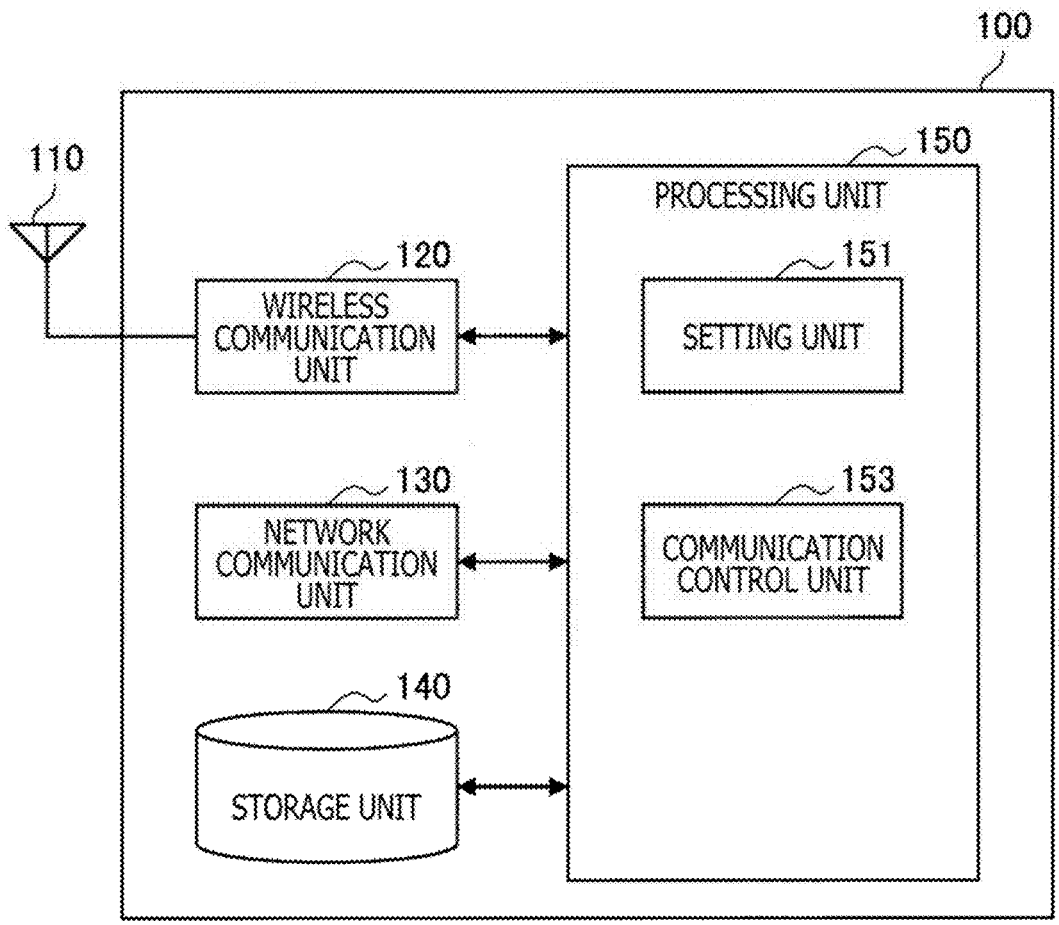
FIG. 8 is a block diagram illustrating an example of a configuration of a base station according to the embodiment.

First, an example of a configuration of the base station 100 will be described with reference to FIG. 8. FIG. 8 is a block diagram illustrating an example of the configuration of the base station 100 according to the present embodiment. As illustrated in FIG. 8, the base station 100 includes an antenna unit 110, a wireless communication unit 120, a network communication unit 130, a storage unit 140, and a control unit 150.

(1) Antenna Unit 110

The antenna unit 110 emits a signal, which is output by the wireless communication unit 120, as a radio wave into the space. In addition, the antenna unit 110 converts a radio wave in the space into a signal and outputs the signal to the wireless communication unit 120.

(2) Wireless Communication Unit 120

The wireless communication unit 120 transmits and receives signals. For example, the wireless communication unit 120 transmits a downlink signal to the terminal apparatus and receives an uplink signal from the terminal apparatus.

(3) Network Communication Unit 130

The network communication unit 130 transmits and receives information. For example, the network communication unit 130 transmits information to other nodes and receives information from other nodes. For example, the other nodes include another base station and a core network node.

(4) Storage Unit 140

The storage unit 140 temporarily or permanently stores programs and various data for the operation of the base station 100.

(5) Control Unit 150

The control unit 150 provides various functions of the base station 100. The control unit 150 includes a setting unit 151 and a communication control unit 153. The setting unit 151 sets resources in the relay UE 200 and the remote UE 300. The resources here are resources for discovery or communication in the sidelink or the Uu link. The communication control unit 153 executes a communication process with the relay UE 200 or the remote UE 300 in the set resources. For example, the communication control unit 153 transmits and receives data signals, control signals, reference signals, and discovery signals to and from the relay UE 200 or the remote UE 300. Note that the part of the communication control unit 153 that acquires various types of information from the relay UE 200 or the remote UE 300 is equivalent to an example of an "acquisition unit" in the base station 100. In addition, the part of the communication control unit 153 that notifies the relay UE 200 or the remote UE 300 of various types of information is equivalent to an example of a "notification unit" in the base station 100. The operation of the base station 100 based on processes of the setting unit 151 and the communication control unit 153 will be described in detail later. Note that the control unit 150 may further include constituent elements other than these constituent elements. That is, the control unit 150 may also perform operations other than the operations of these constituent elements.

<1.8.2. Configuration Example of Relay UE>

Figure 9:
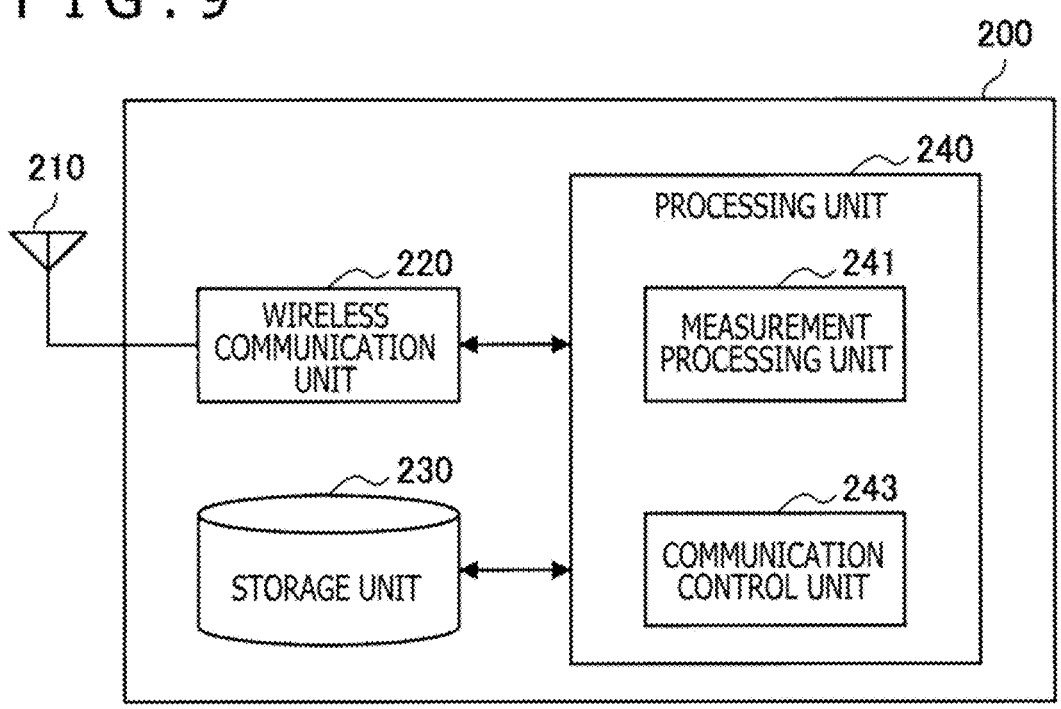
FIG. 9 is a block diagram illustrating an example of a configuration of relay UE according to the embodiment.

Next, an example of a configuration of the relay UE 200 will be described with reference to FIG. 9. FIG. 9 is a block diagram illustrating an example of the configuration of the relay UE 200 according to the present embodiment. As illustrated in FIG. 9, the relay UE 200 includes an antenna unit 210, a wireless communication unit 220, a storage unit 230, and a control unit 240.

(1) Antenna Unit 210

The antenna unit 210 emits a signal, which is output by the wireless communication unit 220, as a radio wave into the space. In addition, the antenna unit 210 converts a radio wave in the space into a signal and outputs the signal to the wireless communication unit 220.

(2) Wireless Communication Unit 220

The wireless communication unit 220 transmits and receives signals. For example, the wireless communication unit 220 receives a downlink signal from the base station and transmits an uplink signal to the base station.

In the present embodiment, the wireless communication unit 220 transmits an uplink signal for the base station 100 to the base station 100 or the relay UE 200 and receives a downlink signal from the base station 100 from the base station 100 or the relay UE 200.

In the present embodiment, the wireless communication unit 220 can receive an uplink signal for the base station 100 from the remote UE 300 and forward the uplink signal to the base station 100. The wireless communication unit 220 can receive a downlink signal for the remote UE 300 from the base station 100 and forward the downlink signal to the remote UE 300.

(3) Storage Unit 230

The storage unit 230 temporarily or permanently stores programs and various data for the operation of the relay UE 200.

(4) Control Unit 240

The control unit 240 provides various functions of the relay UE 200. The control unit 240 includes a measurement processing unit 241 and a communication control unit 243. The measurement processing unit 241 controls a measurement process of a link to the base station 100 or a link to the remote UE 300. For example, the communication control unit 243 communicates with the base station 100 or relays the communication between the base station 100 and the remote UE 300 based on the control by the base station 100. In addition, for example, the communication control unit 243 transmits and receives data signals, control signals, reference signals, and discovery signals to and from the base station 100 or the remote UE 300. Note that the measurement processing unit 241 is equivalent to an example of a "state acquisition unit" in the relay UE 200. In addition, the part of the communication control unit 243 that acquires various types of information from the base station 100 or the remote UE 300 is equivalent to an example of an "acquisition unit" in the relay UE 200. In addition, the part of the communication control unit 243 that notifies the base station 100 or the remote UE 300 of various types of information is equivalent to an example of a "notification unit" in the relay UE 200. The operation of the relay UE 200 based on the process by the communication control unit 243 will be described in detail later. Note that the control unit 240 may further include constituent elements other than these constituent elements. That is, the control unit 240 may perform operations other than the operations of these constituent elements.

<1.8.3. Configuration Example of Remote UE>

Figure 10:
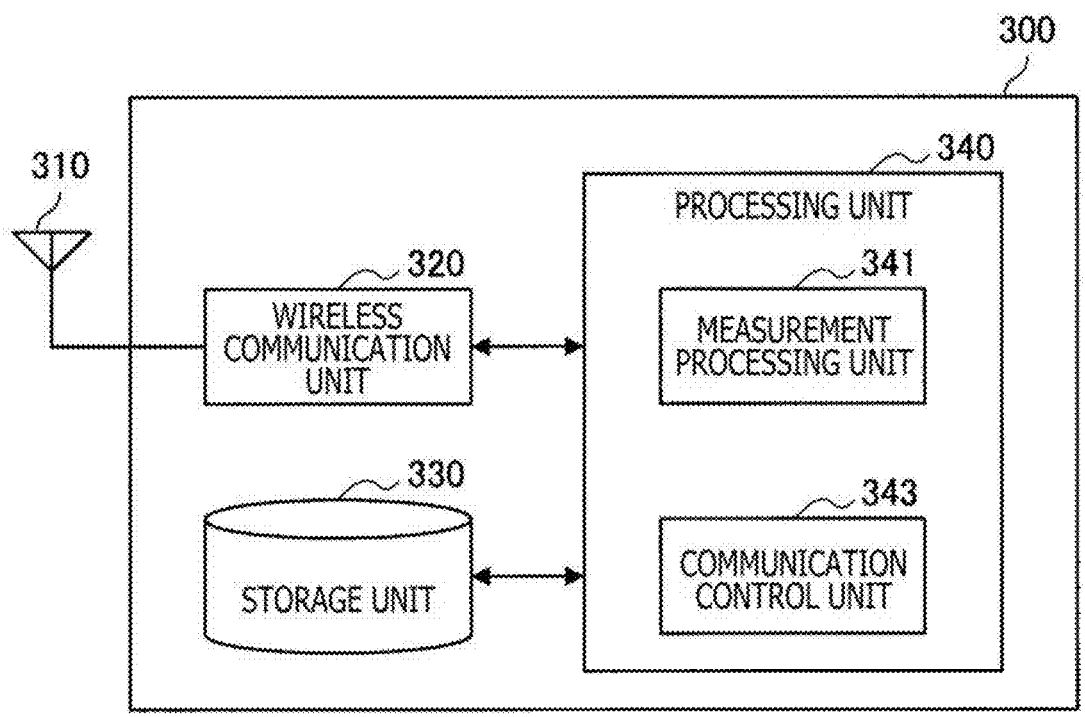
FIG. 10 is a block diagram illustrating an example of a configuration of remote UE according to the embodiment.

Next, an example of a configuration of the remote UE 300 will be described with reference to FIG. 10. FIG. 10 is a block diagram illustrating an example of the configuration of the remote UE 300 according to the present embodiment. With reference to FIG. 10, the remote UE 300 includes an antenna unit 310, a wireless communication unit 320, a storage unit 330, and a control unit 340.

(1) Antenna Unit 310

The antenna unit 310 emits a signal, which is output by the wireless communication unit 320, as a radio wave into the space. In addition, the antenna unit 310 converts a radio wave in the space into a signal and outputs the signal to the wireless communication unit 320.

(2) Wireless Communication Unit 320

The wireless communication unit 320 transmits and receives signals. For example, the wireless communication unit 320 receives a downlink signal from the base station and transmits an uplink signal to the base station.

In the present embodiment, the wireless communication unit 320 transmits an uplink signal for the base station 100 to the base station 100 or the relay UE 200 and receives a downlink signal from the base station 100 from the base station 100 or the relay UE 200.

(3) Storage Unit 330

The storage unit 330 temporarily or permanently stores programs and various data for the operation of the remote UE 300.

(4) Control Unit 340

The control unit 340 provides various functions of the remote UE 300. The control unit 340 includes a measurement processing unit 341 and a communication control unit 343. The measurement processing unit 341 controls a measurement process of a link to the base station 100 and a link to the relay UE 200. The communication control unit 343 executes a communication process with the base station 100 or the relay UE 200 based on the measurement result. In addition, for example, the communication control unit 343 transmits and receives data signals, control signals, reference signals, and discovery signals to and from the base station 100 or the relay UE 200. Note that the part of the communication control unit 343 that acquires various types of information from the base station 100 or the relay UE 200 is equivalent to an example of an "acquisition unit" in the remote UE 300. In addition, the part of the communication control unit 343 that notifies the base station 100 or the relay UE 200 of various types of information is equivalent to an example of a "notification unit" in the remote UE 300. The operation of the remote UE 300 based on the processes by the measurement processing unit 341 and the communication control unit 343 will be described in detail later. Note that the control unit 340 may further include constituent elements other than these constituent elements. That is, the control unit 340 may also perform operations other than the operations of these constituent elements.

2. First Embodiment

A system according to a first embodiment of the present disclosure will be described by focusing on measurement for allocation of a resource pool (resource pool group).

2.1. Technical Problem

Figure 11:
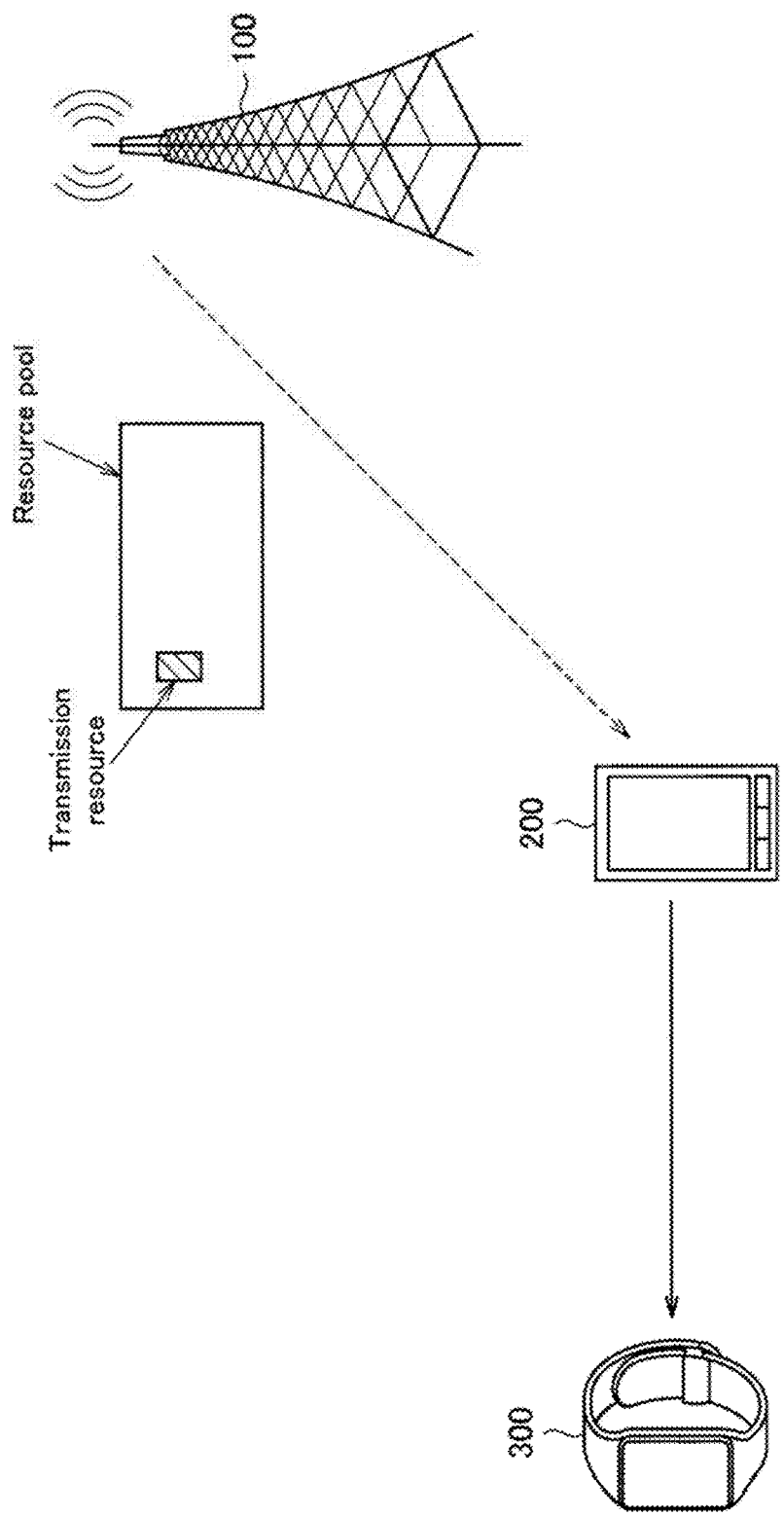
FIG. 11 is an explanatory view for describing an overview of a system according to a first embodiment of the present disclosure.
Figure 12:
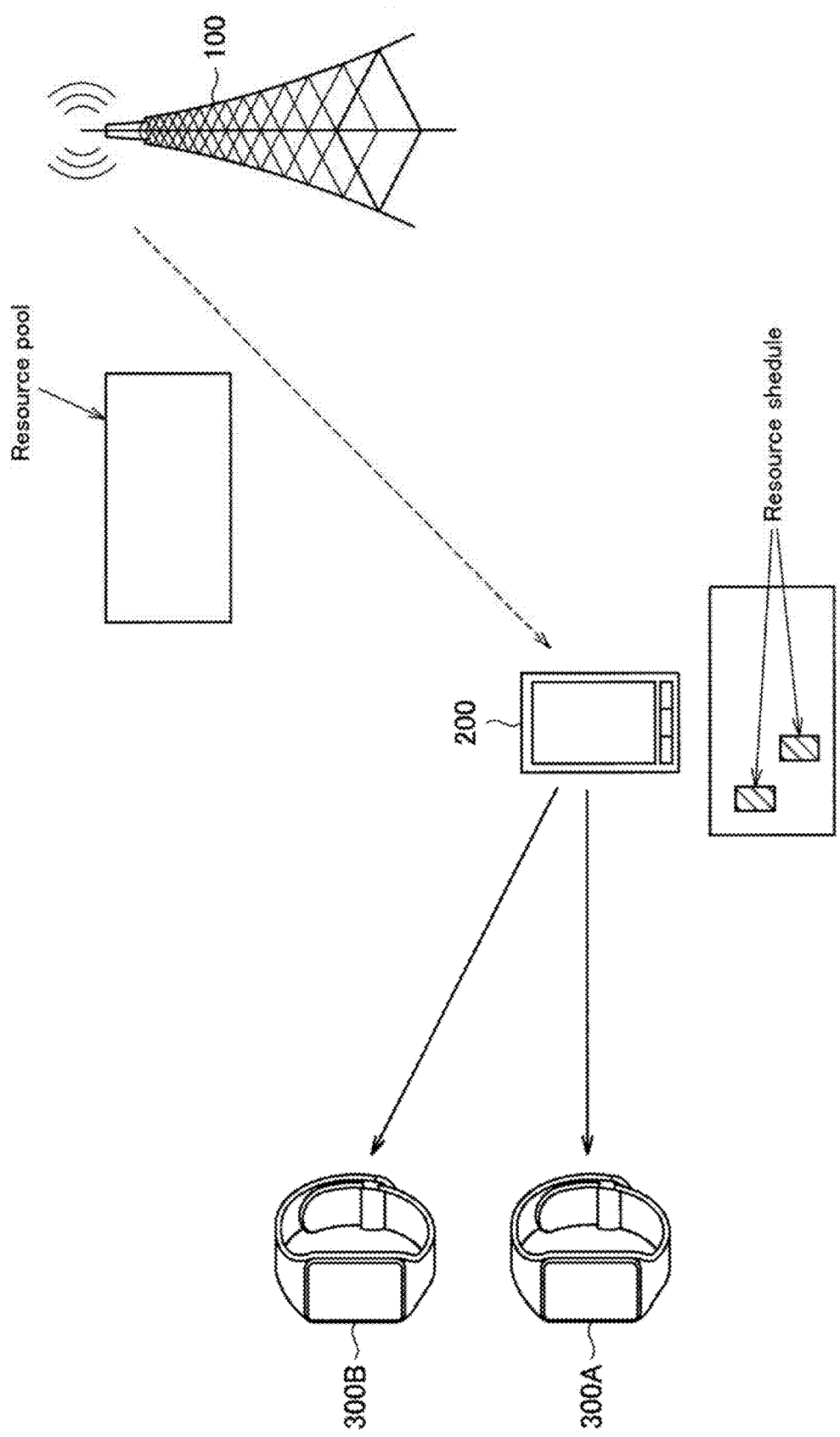
FIG. 12 is an explanatory view for describing an overview of the system according to the first embodiment.

First, a technical problem of the system according to the first embodiment of the present disclosure will be described with reference to FIGS. 11 and 12. FIGS. 11 and 12 are explanatory views for describing an overview of the system according to the present embodiment, and FIGS. 11 and 12 illustrate an example of an allocation method of resources in the FeD2D.

In the FeD2D, examples of the resource allocation method include a system in which the base station 100 allocates resources of the sidelink as illustrated in FIG. 11 and a system in which the relay UE 200 allocates resources of the sidelink under the control of the base station 100 as illustrated in FIG. 12. In the system as illustrated in FIG. 12, the base station 100 delegates some authority regarding communication to the relay UE 200, and the relay UE 200 at least partially controls local sidelink communication under the relay UE 200. Therefore, a reduction in the overhead of the control of the base station 100 can be anticipated in the system illustrated in FIG. 12. In such a resource allocation system, the base station 100 may allocate, to the relay UE 200, a resource pool dedicated to the relay terminal UE 200.

However, when an allocation method for sharing one resource pool by a plurality of pieces of UE is applied to the FeD2D as in D2D of Rel-12, a collision may occur between the pieces of relay UE 200 due to the allocation of the same resource. Under the circumstances, the pieces of relay UE 200 may communicate with each other to coordinate the resource allocation. However, the overhead for the control may be a problem. Therefore, it is desirable that the base station 1000 allocate orthogonal resource pools to the pieces of relay UE 200 (that is, individually allocate exclusive resource pools among the pieces of relay UE 200).

In the case of individually allocating the resource pools to the pieces of relay UE 200, it is desirable that the base station 100 allocate a resource pool more suitable for each piece of relay UE 200. Meanwhile, it is more desirable that the base station 100 can recognize the status of the local sidelink communication under the relay UE 200 when allocating the resource pool more suitable for each piece of relay UE 200. Under the circumstances, the present embodiment proposes an example of a method in which the relay UE 200 or the remote UE 300 measures the status of the sidelink and feeds back the status to the base station 100.

2.2. Technical Features

Next, technical features of the system according to the present embodiment will be described.

Figure 13:
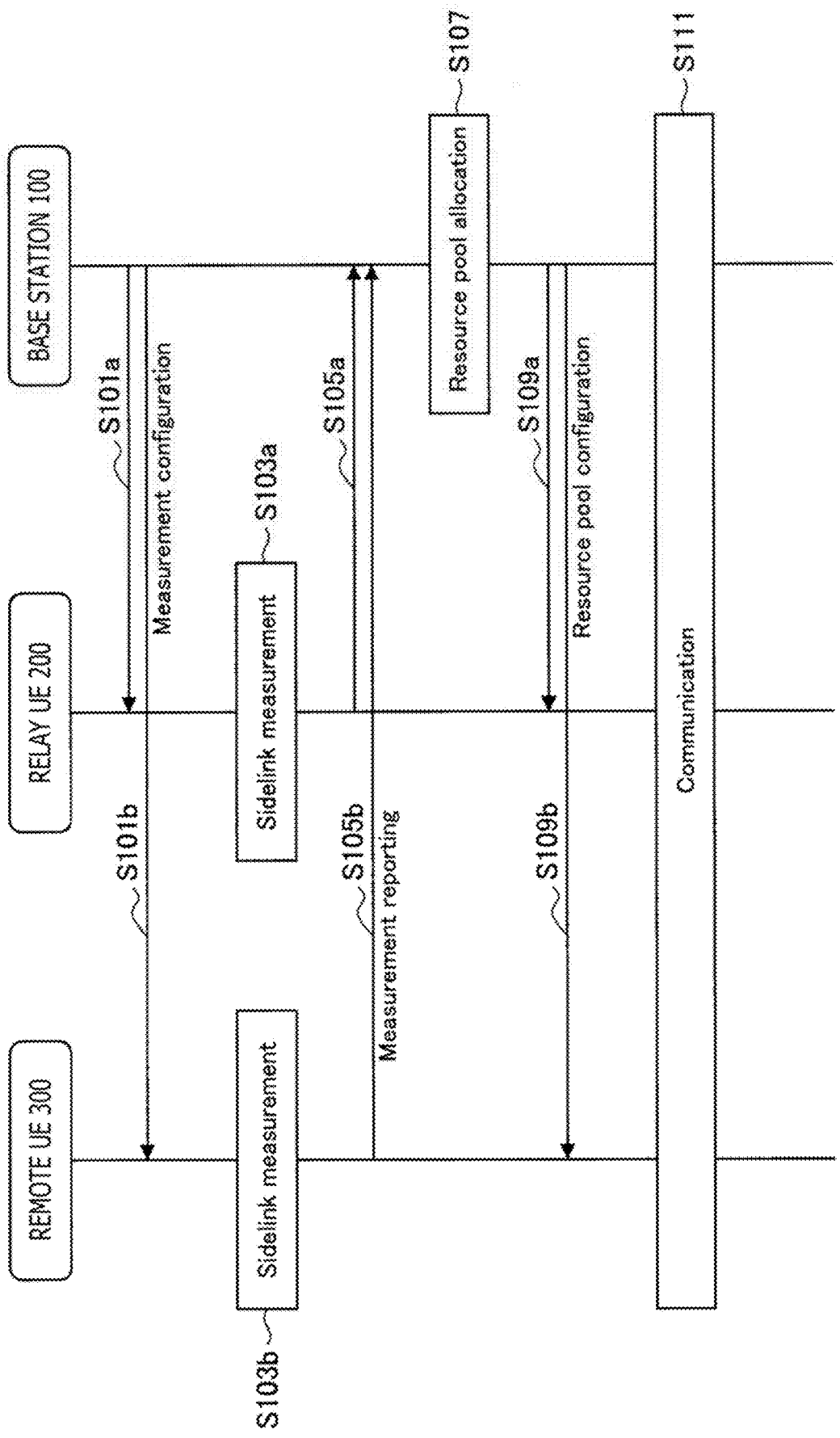
FIG. 13 is a sequence diagram illustrating an example of a flow of a series of processes of the system according to the first embodiment.

First, with reference to FIG. 13, an example of a flow of a series of processes of the system according to the present embodiment will be described by particularly focusing on the process in which the base station 100 individually allocates resource pools to the pieces of relay UE 200. FIG. 13 is a sequence diagram illustrating an example of the flow of the series of processes of the system according to the present embodiment.

First, the base station 100 (setting unit 151) carries out measurement configuration of sidelink for at least one of the relay UE 200 or the remote UE 300 to figure out the status of the sidelink (S101a, S101b).

In response to the setting of the measurement configuration from the base station 100, the relay UE 200 (measurement processing unit 241) carries out measurement of the sidelink (S103a) and reports the result of the measurement to the base station 100 (S105a). Similarly, in response to the setting of the measurement configuration from the base station 100, the remote UE 300 (measurement processing unit 341) carries out measurement of the sidelink (103b) and reports the result of the measurement to the base station 100 (S105b).

The base station 100 (communication control unit 153) carries out allocation of a resource pool to at least one of the relay UE 200 or the remote UE 300 in the network based on the information reported from at least one of the relay UE 200 or the remote UE 300 (S107). The base station 100 notifies at least one of the relay UE 200 or the remote UE 300 of the result of the allocation of the resource pool (S109a, S109b). As a result, the relay UE 200 and the remote UE 300 can use the allocated resource pool to perform the communication (S111).

Note that the information that can be reported by one of the relay UE 200 and the remote UE 300 includes not only the measurement result of the sidelink, but also other information. Examples of the information to be reported include the following information.

Communication quality of sidelink
Terminal category of relay UE
Terminal category of remote UE related to relay UE
BW capability of relay UE
Capability of remote UE related to relay UE
Remaining battery of relay UE
Remaining battery of remote UE related to Relay UE
Priority of packets of relay UE
Priority of packets of remote UE related to relay UE Note that although the base station 100 carries out the measurement configuration in the example illustrated in FIG. 13, the relay UE 200 may be configured to carry out the measurement configuration.

(a) Measurement Configuration
(a-1) Measurement Target

Examples of the measurement target of the measurement configuration include a resource pool, a sub-resource pool, and a sub-resource pool set (that is, a plurality of sub-resource pools). In addition, the sidelink downlink (Sidelink DL) from the relay UE 200 toward the remote UE 300 and the sidelink uplink (Sidelink UL) from the remote UE 300 toward the relay UE 200 in the sidelink communication may be individually set as measurement targets. Note that the details of the sidelink downlink and the sidelink uplink will be separately described later. In addition, the communication through the sidelink performed by the relay UE 200 or the remote UE 300 positioned nearby different from the target of direct communication may be the measurement target.

(a-2) Measurement Items

A specific example of measurement items includes RSSI (Received Signal Strength Indication). Examples of the measurement unit of time in this case include the entire subframe, part of the symbols of the subframe, and a designated symbol or subframe. Note that in the case where part of the symbols of the subframe is the unit of measurement, all symbols except the start symbol (symbol #0) and the end symbol (symbol #13) may be set as the unit of measurement, for example. This is designed to leave one symbol open for the tuning or ACG (automatic gain control). Note that one of the start symbol and the end symbol may be excluded.

In addition, examples of the unit of measurement of bandwidth include a resource block, a sub-resource pool (6PRB), a sub-resource pool set (a plurality of sub-resource pools), and the entire resource pool.

In addition, other examples of the measurement items include RSRP (Reference Signal Received Power) and RSRQ (Reference Signal Received Quality) from the relay UE 200. In this case, examples of a reference signal used to calculate the received signal power include SLSS: SideLink Synchronization Signal (PSSS: Primary Sidelink Synchronization Signal/SSSS: Secondary Sidelink Synchronization Signal) transmitted at the center frequency, DMRS of PSBCH transmitted at the center frequency, SLSS transmitted in the sub-resource pool, DMRS of PSDCH transmitted in the sub-resource pool, and the like. In addition, the measurement items may be RSRP and RSRQ from the remote UE 300 or may be RSRP and RSRQ from both of the relay UE 200 and the remote UE 300.

In addition, another example includes RIP (Received Interference Power). In this case, the sidelink received interference power is the target of measurement, and the received interference power can include, for example, thermal noise.

In addition, the degree of congestion of channel may be measured in another example. In this case, for example, the proportion of control channels that can be decoded in the control channel region may be measured. In addition, energy sensing may be carried out in another example, and the proportion of detected power equal to or greater than a threshold may be measured.

In addition, the reception success rate in the sidelink may be measured in another example. In another specific example, the reception success rate may be calculated based on the result of counting the number of ACS/NACK.

(a-3) Notification Method

The information regarding the measurement configuration is notified by using, for example, RRC connection setup, RRC connection reconfiguration, RRC connection re-establishment message, or the like. In addition, the remote UE 300 may be notified of the information through a relay. The relay UE 200 notifies the remote UE 300 of the information by using, for example, Sidelink RRC signaling.

The base station 100 uses Downlink SIB to notify the relay UE 200 and the remote UE 300 of the information regarding the measurement items. However, the information may be notified by using a method other than the SIB. In addition, the remote UE 300 may be notified of the information through the relay UE 300. In this case, Downlink SIB is used to transmit the information to the relay UE 200, and Sidelink SIB is used to transmit the information from the relay UE 200 to the remote UE 300.

The result of the measurement by the relay UE 200 may be used for the resource allocation by the relay UE 200, or the base station 100 may be notified of the result. In addition, other relay UE 200 may be notified of the result. The relay UE 200 may be notified of the result of the measurement by the remote UE 300, or the base station 100 may be notified of the result through the relay UE 200. In addition, the remote UE 300 may use the result of the measurement for the allocation of resources or the selection of resources.

In addition, the relay UE 200 may integrate the results of the measurement by a plurality of pieces of remote UE 300 and report the results as one result of measurement to the base station 100. For example, the relay UE 200 may report, to the base station 100, one worst result among the measurement results reported from N pieces of remote UE 300. In addition, the relay UE 200 may report an average of the measurement results to the base station 100.

In addition, the relay UE 200 and the remote UE 300 may report different measurement results. For example, the remote UE 300 may measure the communication quality of a channel (for example, Sub-resource pool: 6PRB or the like) with a limited bandwidth of sidelink and feed back the communication quality to the relay UE 200 or to the base station 100 through the relay UE 200. On the other hand, the relay UE 200 may measure the communication quality of the entire sidelink for each sub-resource pool group, which is a set of a plurality of sub-resource pools, and report the communication quality to the base station.

Figure 14:
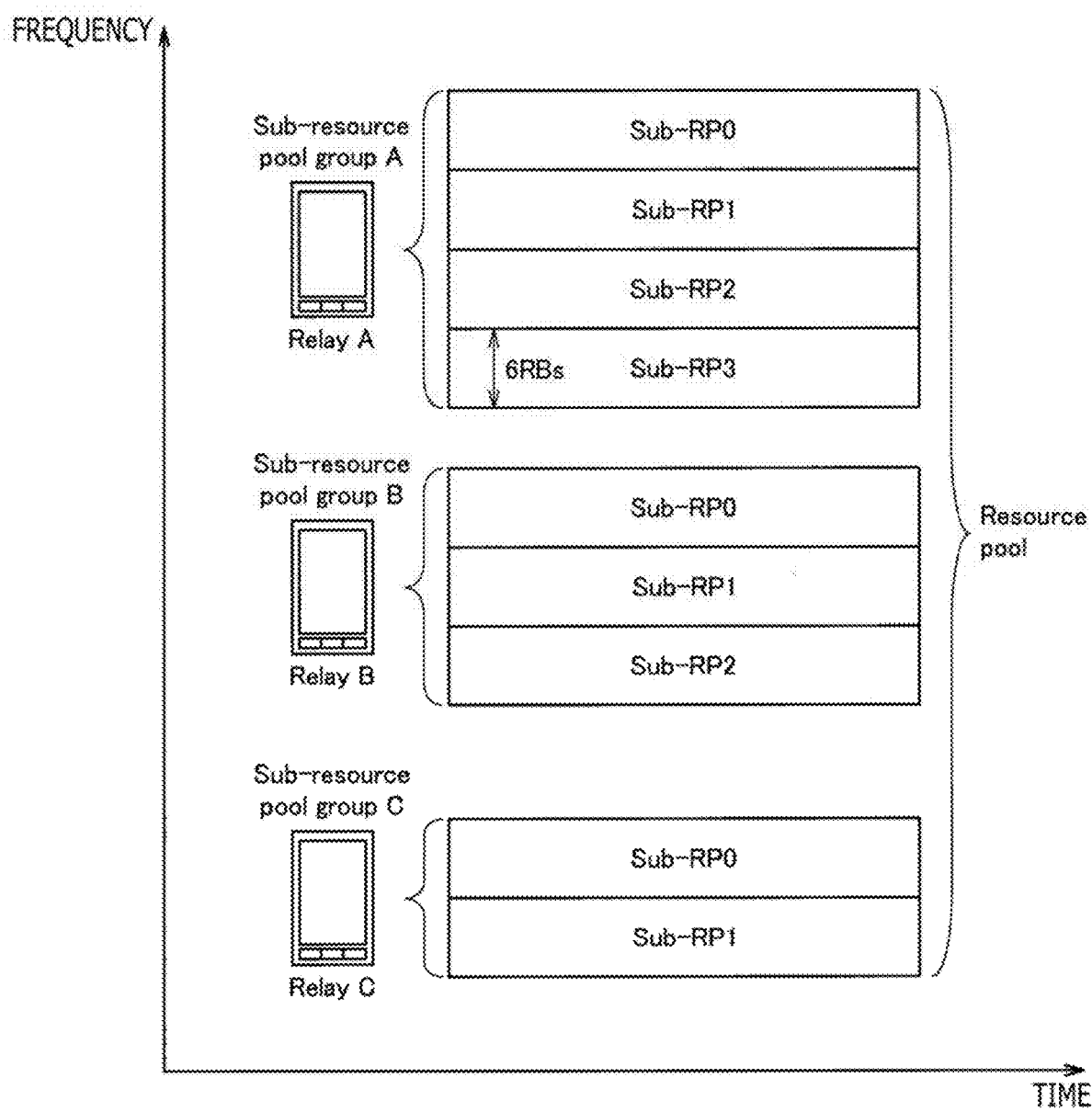
FIG. 14 is an explanatory view for describing a sub-resource pool group.

For example, FIG. 14 is an explanatory view for describing the sub-resource pool group. As illustrated in FIG. 14, the sub-resource pool group is provided to include one or more sub-resource pools. The sub-resource pool group is individually allocated to the grouped relay UE 200. Specifically, as illustrated for example in FIG. 14, the base station 100 allocates, from the resource pool allocated to a series of grouped relay UE 200 (for example, "Relay A" to "Relay C" illustrated in FIG. 14), partial resource pools as a sub-resource pool group to each piece of relay UE 200.

Note that the relay UE 200 may carry out the measurement of not only the sub-resource pool group used by the relay UE 200, but also the sub-resource pool group used by other relay UE 200 or other remote UE 300. Similarly, the remote UE 300 may also carry out the measurement of the sub-resource pool group used by relay UE 200 other than the relay UE 200 that is the communication target of the remote UE 300.

(a-4) Notification Items of Configuration

Examples of notification items of configuration include the ID of the relay UE 200 (relay ID) and the ID of the remote UE 300 (remote ID) as measurement targets, information regarding the sub-resource pool and the resource pool as measurement targets, time axis information of the measurement target, mapping table information for converting the measurement result into bit information, and measurement item information. Note that the time axis information of the measurement target can include at least one of a bitmap table, sidelink downlink and sidelink uplink information, a measurement window, a period of the window, or an offset of the window. In addition, an example of the measurement item information includes the information regarding measurement as a measurement item described above.

(b) Measurement Reporting (b-1) Report Trigger

The relay UE 200 and the remote UE 300 may perform reporting in a case where a trigger condition designated by the base station 100 is satisfied.

An example of an event trigger for the sidelink includes a case in which the result of measurement regarding one or more sub-resource pools (or sub-resource pool group) becomes equal to or greater than a threshold or becomes equal to or smaller than a threshold. In addition, another example of the event trigger includes a case in which the result of measurement regarding N or more sub-resource pools among the plurality of sub-resource pools instructed to be measured becomes equal to or greater than a threshold or becomes equal to or smaller than a threshold. Note that the setting of the variable N may be changed in this case. In addition, another example of the event trigger includes a case in which part of the sub-resource pools is set as a reference sub-resource pool (also referred to as "anchor resource pool"), and the quality of the reference sub-resource pool exceeds or falls below the quality of other sub-resource pools.

In addition, the relay UE 200 and the remote UE 300 may perform reporting in a case where an instruction for measurement report is received from the base station 100.

In addition, the relay UE 200 and the remote UE 300 may be triggered by reception of an instruction for measurement report from the base station 100 to perform reporting. In addition, the relay UE 200 and the remote UE 300 may transmit a report after X subframes from the notification of an instruction for measurement or an instruction for report of measurement. Note that an offset value of the X subframes may be notified from the base station 100 or the relay UE 200.

(b-2) Measurement Gaps

Figure 15:
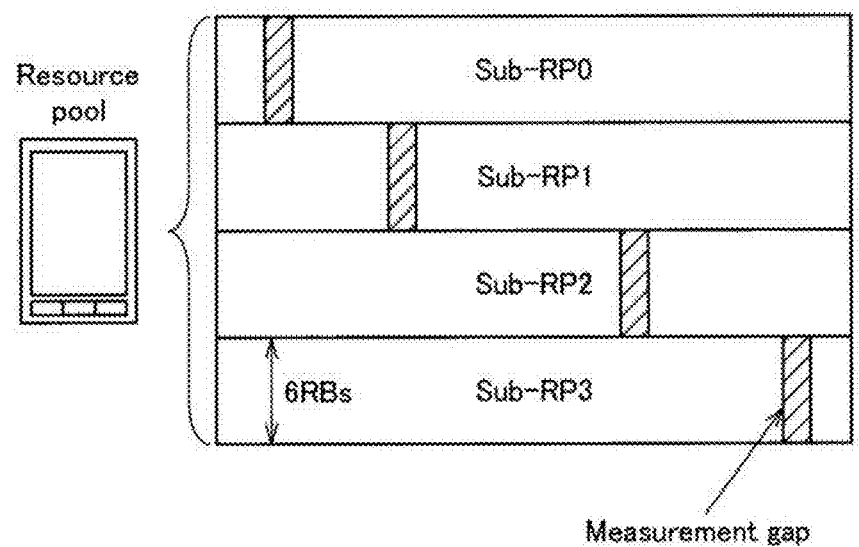
FIG. 15 is a diagram illustrating an example of a configuration of measurement gaps in a sidelink.

In a case where the remote UE 300 sets a plurality of sub-resource pools as targets of measurement, it is difficult to measure all of the sub-resource pools at once. Therefore, measurement gaps are introduced into the sub-resource pools. The remote UE 300 carries out the measurement of the sub-resource pools according to the measurement gaps. In this case, for example, the base station 100 can notify each terminal (for example, relay UE 200 or remote UE 300) of a gap offset and a gap repetition period. For example, FIG. 15 is a diagram illustrating an example of a configuration of the measurement gaps in the sidelink.

Note that in a case where the relay UE 200 measures a plurality of resource pools other than the resource pool allocated to the relay UE 200, the measurement gaps may be similarly applied to the plurality of resource pools. Furthermore, in a case where the relay UE 200 measures a plurality of sub-resource pools allocated to the relay UE 200, the measurement gaps may be similarly applied to the plurality of sub-resource pools.

(c) Other Features

The relay UE 200 or the remote UE 300 provided with the resource pool may notify the base station 100 of the QoS (for example, traffic, UE category, or the like) of the relay UE 200 or the remote UE 300. In this case, the base station 100 may take into account the notified QoS information to carry out the allocation of the resource pool.

The relay UE 200 or the remote UE 300 may periodically transmit BSR (Buffer Status Report) to the base station 100.

As a result, the base station 100 can also deactivate one or more of the allocated sub-resource pools according to the BSR.

The base station 100 may notify the relay UE 200 or the remote UE 300 of a threshold of the BSR. The relay UE 200 or the remote UE 300 may deactivate one or more sub-resource pools in a case where the value of the BSR of the relay UE 200 or the remote UE 300 falls below the threshold. In addition, a plurality of thresholds may be notified, and the number of sub-resource pools to be deactivated may be controlled according to each threshold. In addition, the relay UE 200 or the remote UE 300 may notify the base station 100 of the deactivated sub-resource pools.

The relay UE 200 provided with the resources may notify other relay UE 200 positioned nearby of the setting regarding DRX (Discontinous Reception) of the relay UE 200. In addition, the relay UE 200 at this point may also notify the other relay UE 200 of the information regarding the resource pool allocated to the relay UE 200. As a result, when the other relay UE 200 positioned nearby determines that the target relay UE 200 enters the DRX, the other relay UE 200 may use sub-resource pools not used by the relay UE 200.

The relay UE 200 provided with the resources may notify the other relay UE 200 positioned nearby or the base station 100 of the information regarding the sub-resource pools not used. In this case, the other relay UE 200 positioned nearby may temporarily use the notified resources.

(d) Example

Figure 16:
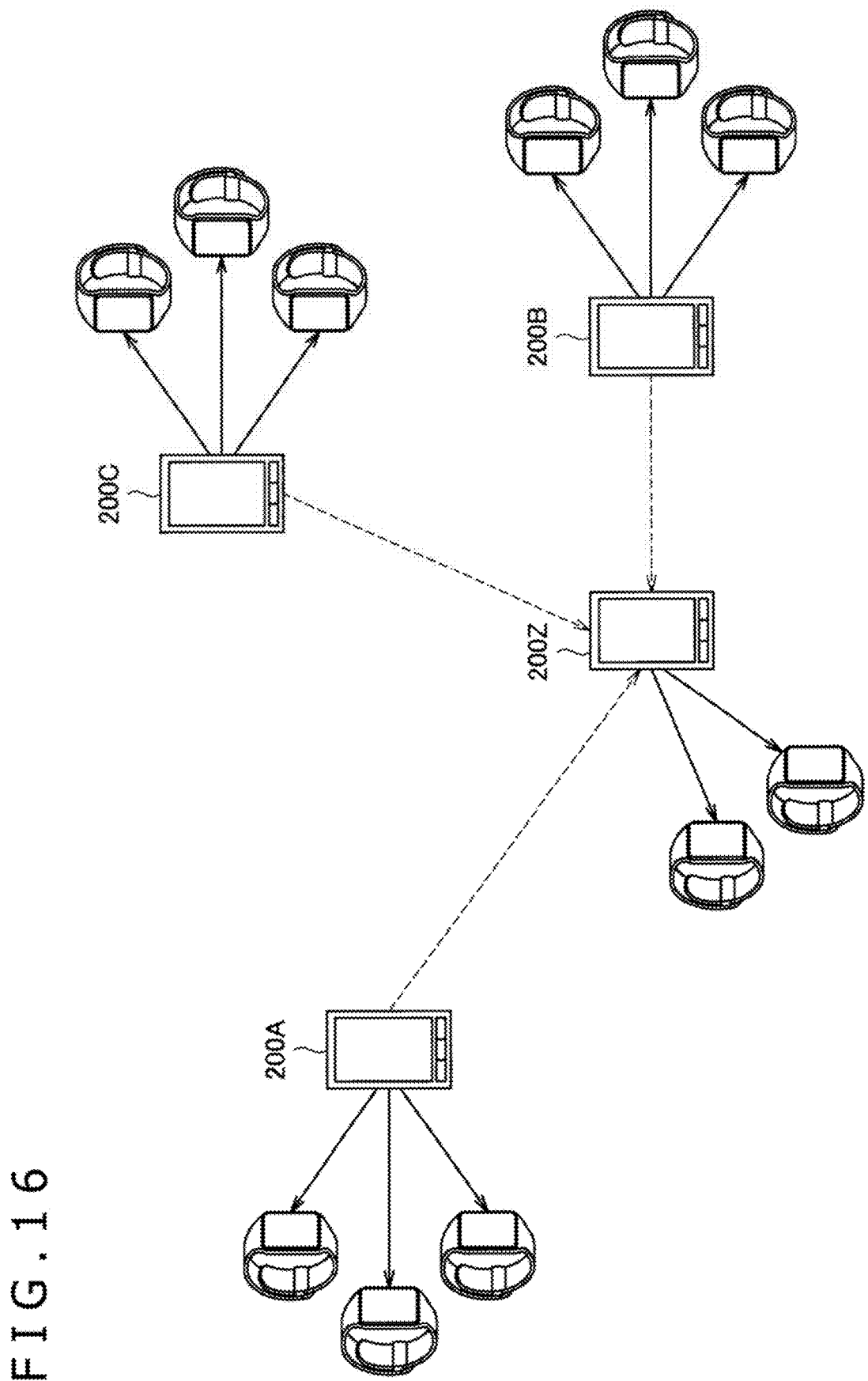
FIG. 16 is an explanatory view for describing Embodiment of the system according to the first embodiment.
Figure 17:
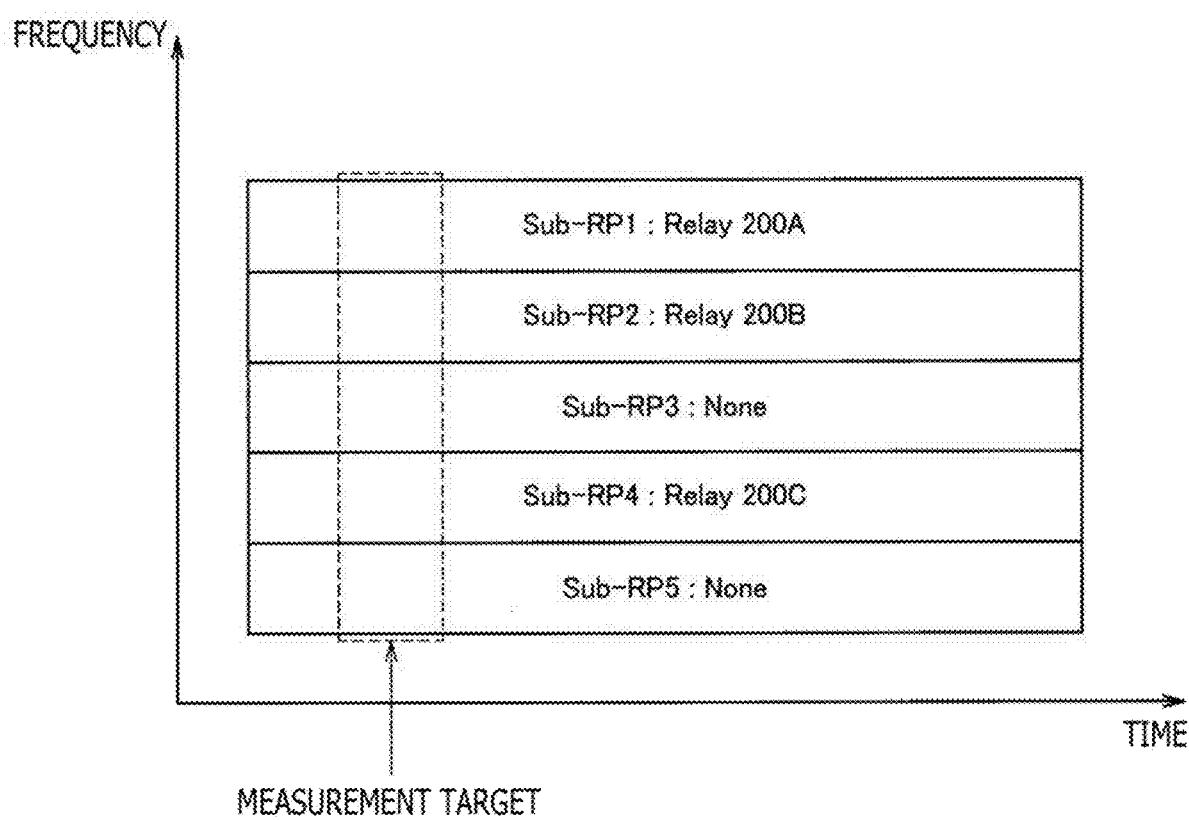
FIG. 17 is an explanatory view for describing Example of the system according to the first embodiment.

Example of the system according to the present embodiment will be described with reference to FIGS. 16 and 17. FIGS. 16 and 17 are explanatory views for describing Example of the system according to the present embodiment. Specifically, FIGS. 16 and 17 illustrate an example of a case in which relay UE 200Z measures RSRP from each piece of relay UE 200A, 200B, and 200C. In addition, as illustrated in FIG. 17, there are five sub-channels in the resource pool, and Sub-RP1, Sub-RP2, and Sub-RP4 of sub-resource pools Sub-RP1 to Sub-RP5 are allocated to the relay UE 200A, 200B, and 200C.

The base station 100 determines to which sub-resource pool the relay UE 200Z is to be allocated, according to the measurement result from at least part of the terminals (for example, at least one of a plurality of pieces of relay UE 200). Note that in the present description, the relay UE 200Z carries out the measurement and performs the reporting.

The relay UE 200Z performs measurement of each sub-resource pool as set in advance. In the example illustrated in FIGS. 16 and 17, the sub-resource pools Sub-RP1, Sub-RP, and Sub-RP4 are allocated to other pieces of relay UE 200 (that is, relay UE 200A, 200B, and 200C), respectively. Therefore, the relay UE 200Z detects higher RSRP and RSSI in a case of RSRP and RSSI measurement.

On the other hand, low RSRP and relatively high RSSI are detected in the measurement of the sub-resource pool Sub-RP3 due to the influence of in-band emission from the relay UE 200B positioned near the relay UE 200Z.

In addition, large RSRP and RSSI are not particularly detected in relation to the sub-resource pool Sub-RP5.

The relay UE 200Z reports the RSSI and the RSRP in each sub-resource pool to the base station 100. The base station 100 may allocate, for example, the sub-resource pool Sub-RP5 to the relay UE 200Z based on the report results from the relay UE 200Z.

(e) Sidelink Downlink (Sidelink DL) and Sidelink Uplink (Sidelink UL)

Next, the sidelink downlink (Sidelink DL) and the sidelink uplink (Sidelink UL) will be described in more detail.

In the FeD2D, the sidelink downlink and the sidelink uplink may be defined to solve a Half Duplex problem in which the reception becomes difficult during the transmission.

Figure 18:
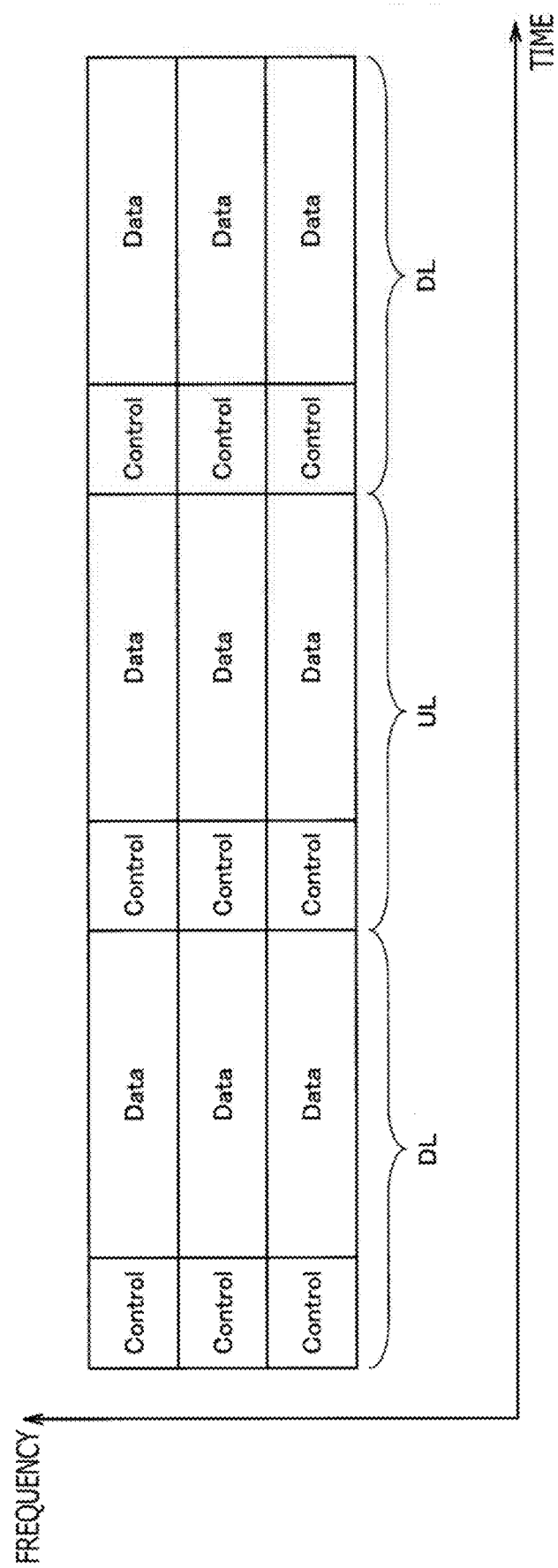
FIG. 18 is an explanatory view for describing an example of definition of a sidelink downlink and a sidelink uplink.
Figure 19:
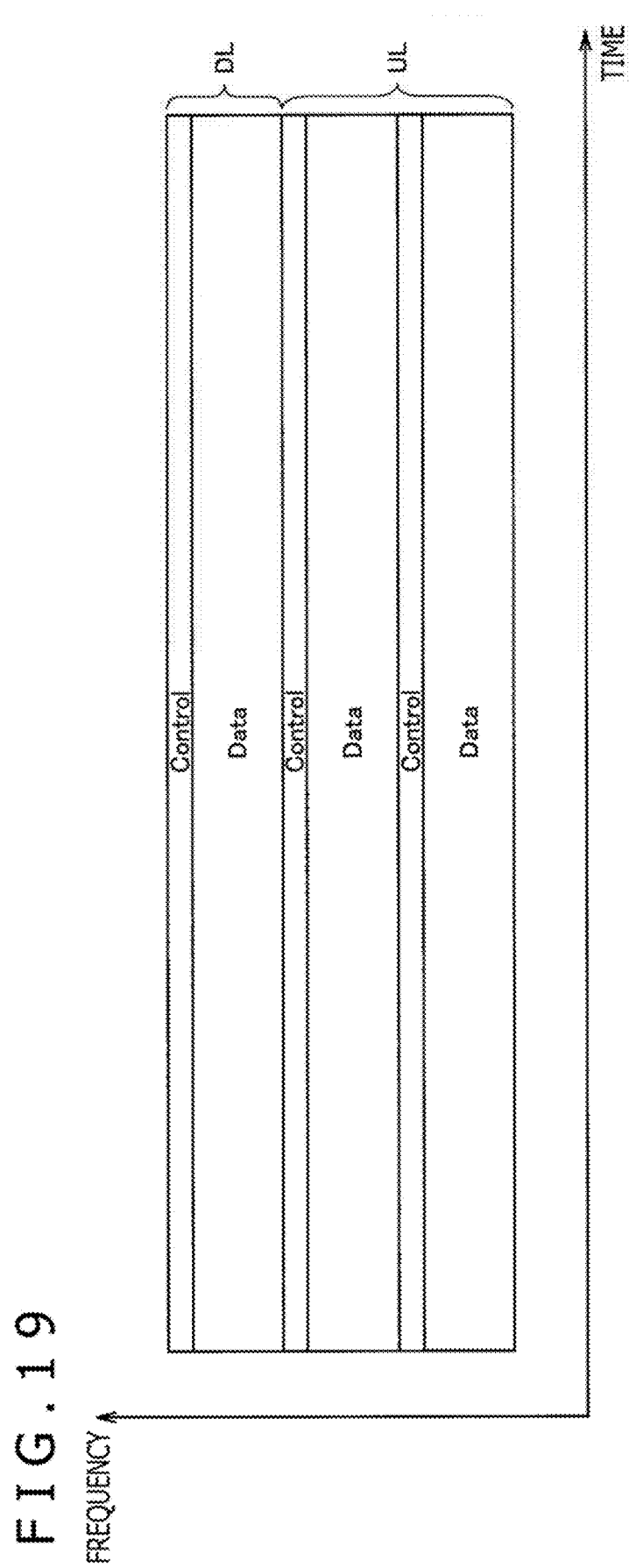
FIG. 19 is an explanatory view for describing an example of the definition of the sidelink downlink and the sidelink uplink.
Figure 20:
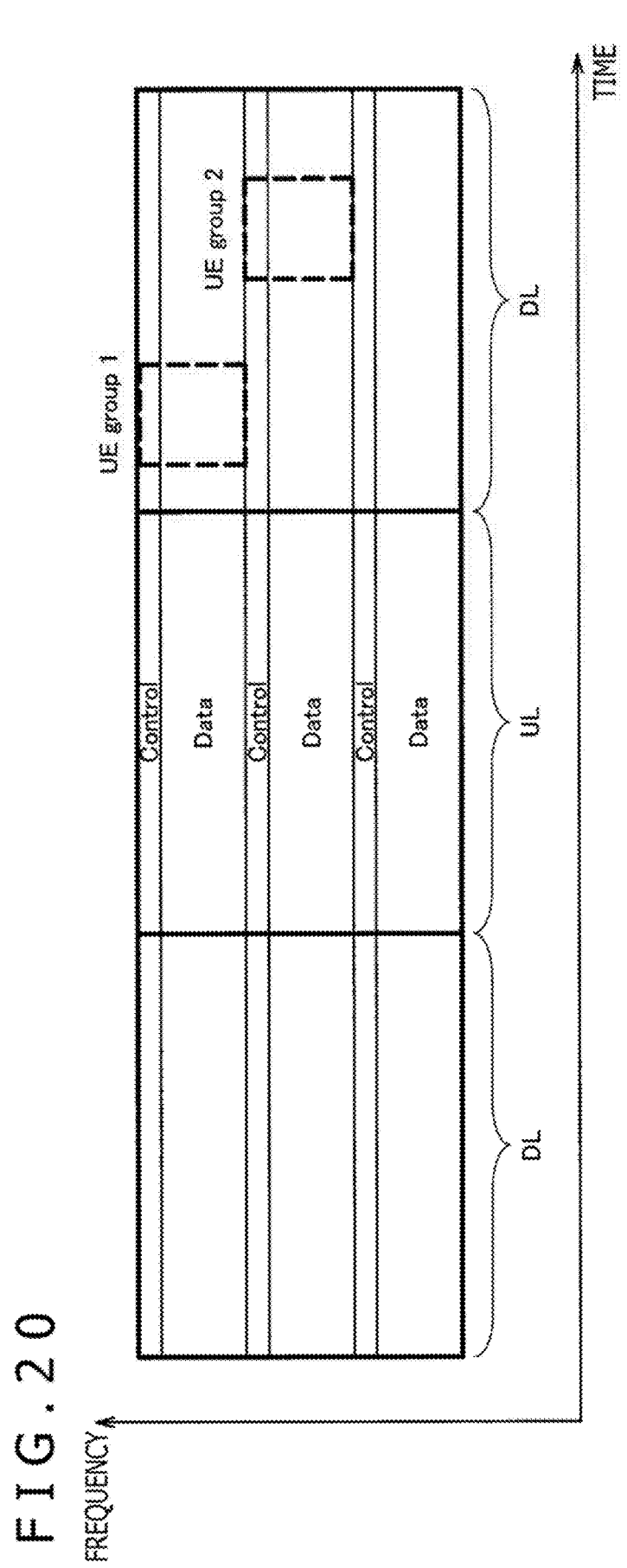
FIG. 20 is an explanatory view for describing an example of the definition of the sidelink downlink and the sidelink uplink.
Figure 21:
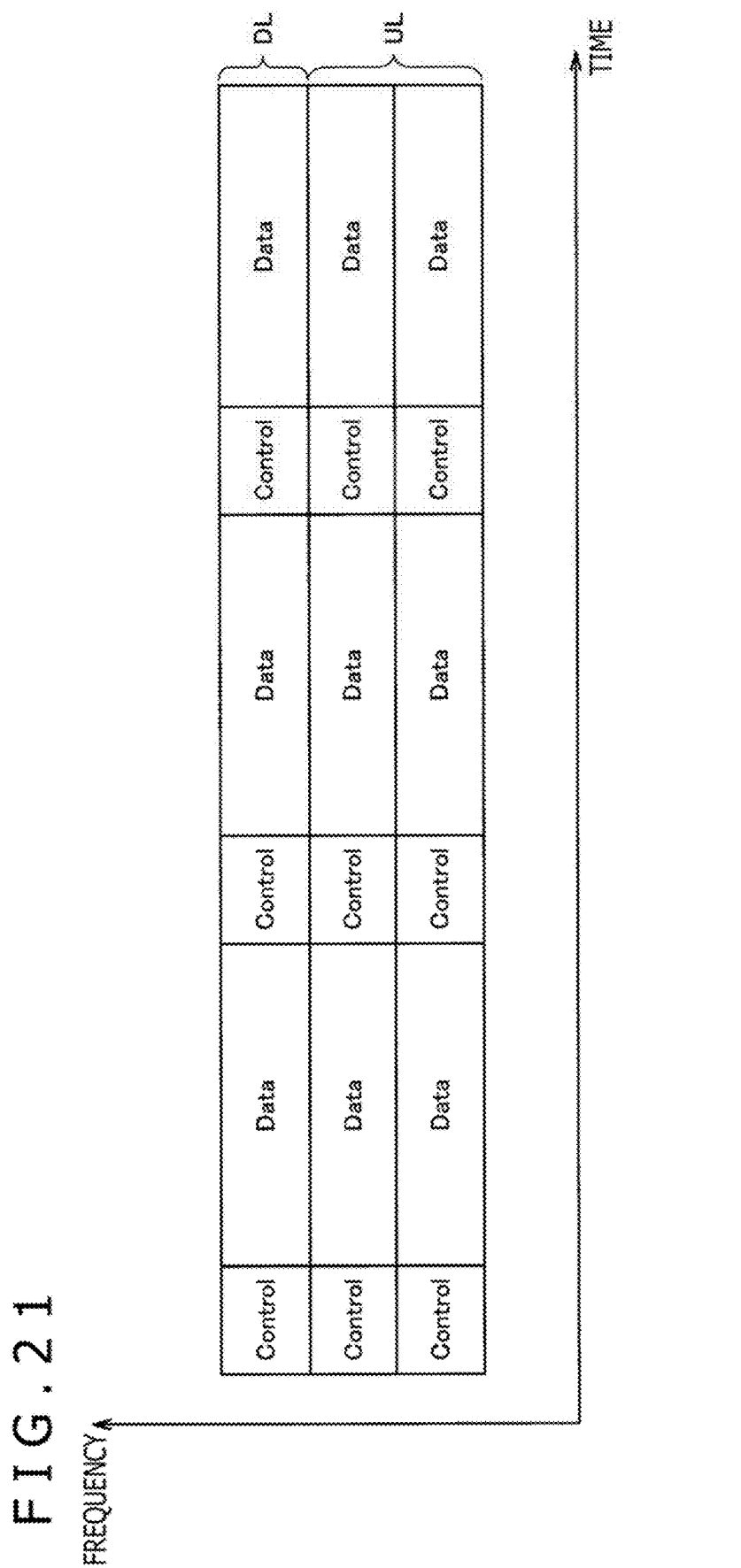
FIG. 21 is an explanatory view for describing an example of the definition of the sidelink downlink and the sidelink uplink.

For example, FIGS. 18 to 21 are explanatory views for describing examples of the definition of the sidelink downlink and the sidelink uplink, and FIGS. 18 to 21 illustrate examples of cases of TDM and FDM of control information and data. For example, FIGS. 18 and 20 illustrate an example of the case of the TDM of the control information and the data. In addition, FIGS. 19 and 20 illustrate an example of the case of the FDM of the control information and the data.

Specifically, for example, the allocation may be further carried out for each UE group in downlink and uplink regions in the case of the FDM of the control information and the data as illustrated in FIG. 20. As a result, the UE (for example, relay UE 200, remote UE 300, and the like) in the UE group can use the regions designated for the UE group as the sidelink downlink/sidelink uplink of the UE. This can reduce the wake-up time of the UE, and a reduction of power consumption can be anticipated.

Note that the proportion of sidelink downlink/sidelink uplink is set by the relay UE 200 or the base station 100. In this case, the proportion of the sidelink downlink/sidelink uplink may be set based on information provided from the remote UE 300 or the relay UE 200. Examples of the information provided from the remote UE 300 or the relay UE 200 include BSR (Buffer status report) of the remote UE 300 or the relay UE 200, a DL (Downlink)/UL (Uplink) request, DL/UL configuration information from the relay UE 200 positioned nearby, a type of remote UE 300 or relay UE 200, and priority of traffic of the remote UE 300 or the relay UE 200. The DL/UL request is equivalent to a downlink increase request or an uplink increase request. In addition, the DL/UL configuration information can be acquired based on system information or SCI (Sidelink Control Information) regarding the relay UE 200 positioned nearby. In addition, examples of the type of remote UE 300 or relay UE 200 include UE category information and UE capability information. Furthermore, in a case where the sidelink downlink/sidelink uplink is set in the relay UE 200, the relay UE 200 may notify the base station 100 of the setting result.

In addition, the proportion of the sidelink downlink/sidelink uplink may be provided as system information of the sidelink and may be notified by SCI (Sidelink Control Information).

2.3. Evaluation

In this way, the base station 100 in the system according to the present embodiment acquires, from another apparatus (for example, relay UE 200 or remote UE 300), the information regarding the state of communication through the resource pool allocated to the wireless links between at least part of the plurality of pieces of relay UE 200 and the remote UE 300. In addition, the base station 100 individually controls the allocation of the resource pool (for example, sub-resource pool groups) to each wireless link between each of the plurality of pieces of relay UE 200 and the remote UE 300 associated with the relay UE 200 on the basis of the acquired information.

On the basis of the above configuration, the base station 100 can recognize the status of local sidelink communication under each piece of relay UE 200 according to the system of the present embodiment. Therefore, the base station 100 can allocate the resource pool to each piece of relay UE 200 in a more suitable mode. As a result, the system according to the present embodiment can realize FeD2D communication with higher quality.

3. Second Embodiment

Next, a system according to a second embodiment of the present disclosure will be described by focusing on measurement and UE control for allocating the resources in the resource pool.

3.1. Technical Problem

First, a technical problem of the system according to the present embodiment will be described. In the method of resource allocation described with reference to FIG. 11, the base station 100 carries out the allocation of resources for the sidelink. Therefore, it is desirable to feed back, to the base station 100, the result of measurement regarding the communication quality of the sidelink to perform the resource allocation and the transmission control (for example, link adaptation, retransmission control, transmission power control, and the like) in a more suitable mode. The communication with low power consumption is desirable in the FeD2D, and an efficient measurement method with low power consumption is desirable. Furthermore, in the case of the unidirectional relay, it is difficult to directly provide feedback from the relay UE 200 to the remote UE 300 through the sidelink. Therefore, a desirable mechanism is that the relay UE 200 directly performs the resource allocation control and the transmission control of the remote UE 300 through the base station 100. Therefore, an example of a technique for solving the problem will be proposed.

3.2. Technical Features (a) Distributed Measurement

In the wearable use case described with reference to FIG. 2, there is a feature that the distances between the relay UE 200 and the plurality of pieces of remote UE 300 are substantially equal. Therefore, in a case where the remote UE 300 side performs the measurement regarding the communication quality of the sidelink, there is a case in which a plurality of pieces of remote UE 300 measures the same measurement target, and as a result, the measurement results are substantially equal. Such a situation is not desirable in terms of power consumption. Therefore, an example of a technique will be proposed, in which the plurality of pieces of remote UE 300 shares the measurement results (in other words, a technique in which the plurality of pieces of remote UE 300 shares the load of measurement) in the case where the remote UE 300 side performs various types of measurement.

Figure 22:
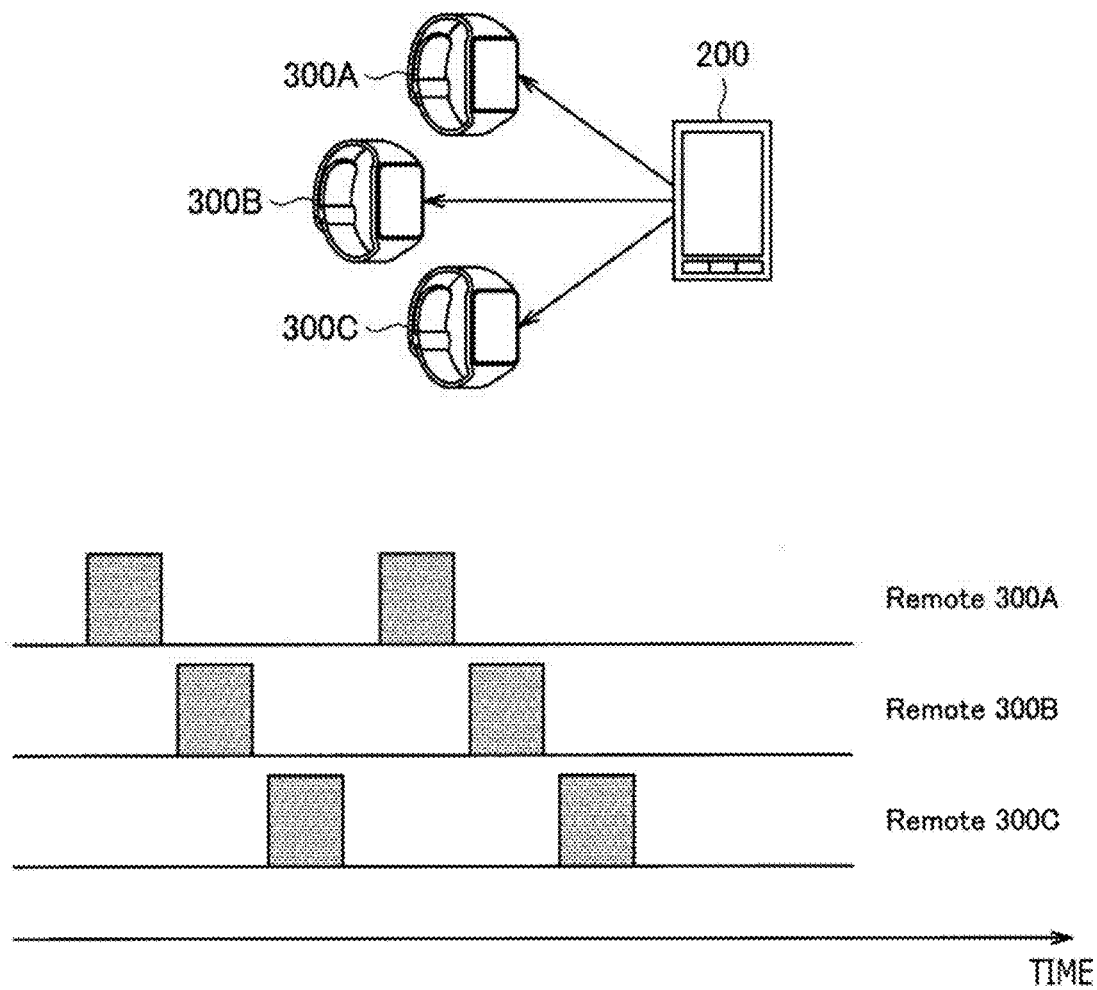
FIG. 22 is an explanatory view for describing an overview of a mode of a system according to a second embodiment of the present disclosure.

For example, FIG. 22 is an explanatory view for describing an overview of a mode of the system according to the present embodiment. Note that in the present description, it is assumed that the relay UE 200 and each piece of remote UE 300A to 300C is connected through the sidelink as illustrated in the drawing on the upper side of FIG. 22. In a case where, for example, the measurement is performed six times on the remote UE 300 side based on the configuration, the remote UE 300A to 300C may share the load and execute the six times of measurement as illustrated in the drawing on the lower side of FIG. 22. As a result of the control, each piece of remote UE 300A to 300C just needs to perform the measurement twice.

Note that the relay UE 200 can set the configuration of the control, and the relay UE 200 can notify each piece of remote UE 300 (that is, remote UE 300A to 300C) of the frequency and the time to be measured. Note that the relay UE 200 figures out the number of pieces of remote UE 300 managed by the relay UE 200, and the relay UE 200 can recognize the degree of measurement that each piece of remote UE 300 needs to perform.

In addition, the remote UE 300 notifies the relay UE 200 of the measurement result. The relay UE 200 can receive the measurement results from a plurality of pieces of remote UE 300 (for example, remote UE 300A to 300C illustrated in FIG. 22) and perform the resource allocation and the transmission control based on at least part of the measurement results. Specifically, the relay UE 200 may carry out, for example, the link adaptation, the retransmission control, the transmission power control, and the like based on the worst measurement result among the measurement results received from the plurality of pieces of remote UE 300.

(b) Transmission Method of Feedback in Unidirectional Relay

Figure 23:
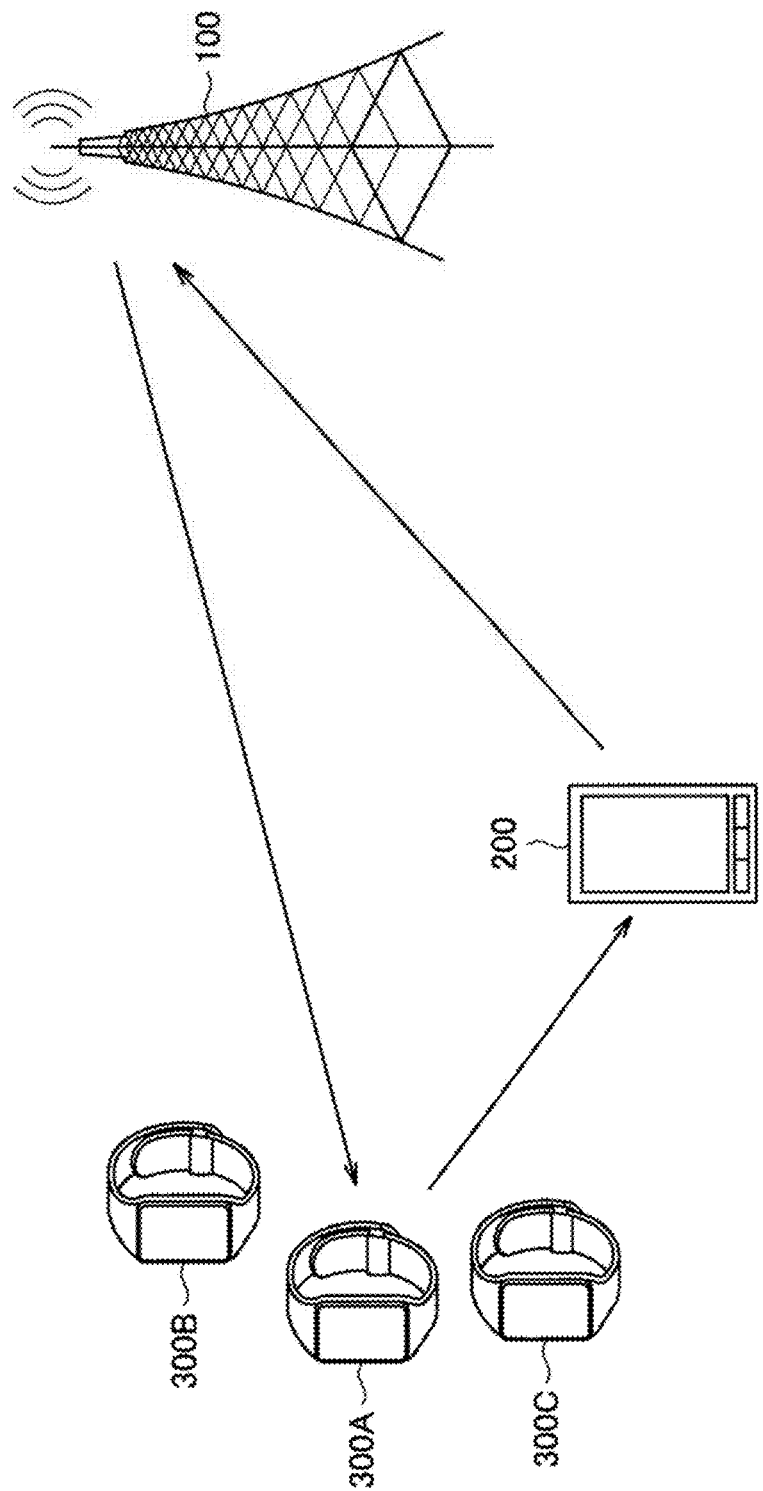
FIG. 23 is an explanatory view for describing a mode of the system according to the second embodiment.

The relay UE 200 receives a signal transmitted from the remote UE 300, and feedback information regarding the link adaptation, the retransmission control, the transmission power control, and the like is returned to the remote UE 300. It is difficult to transmit the feedback information to the remote UE 300 through the sidelink in the case of the unidirectional relay. Therefore, for example, the relay UE 200 receives the information transmitted from the remote UE 300 through the sidelink and notifies the remote UE 300 of the feedback information through the base station 100. For example, FIG. 23 is an explanatory view for describing a mode of the system according to the present embodiment, and FIG. 23 schematically illustrates a path of the feedback.

The relay UE 200 figures out the state of the channel, the transmission and reception state of packets, and the like based on the signal from the remote UE 300. The relay UE 200 creates feedback information based on the information. Note that the feedback information can include information regarding link adaptation information (MCS), a retransmission request, the number of retransmissions, transmission power control, and the like.

The relay UE 200 requests the base station 100 to forward the feedback information. Examples of a transmission method of the feedback information include using the control channel of the uplink to transmit the feedback information and piggybacking the data channel to transmit the feedback information. In this case, for example, a remote ID of the target, a feedback result, and a remote feedback flag are transmitted. A relay ID may be used in place of the remote ID. In addition, a remote group ID (for example, Group RNTI) may be defined, and the remote UE 300 as a group connected to the relay UE 200 may be associated with the ID.

The base station 100 recognizes the flag and then transmits the feedback information to the target remote UE 300 or the group of the target remote UE 300. In the case where the feedback information is transmitted based on the relay ID, the remote UE 300 receives the feedback information as the relay UE 200. Only the target remote UE 300 may be notified of the feedback information, or the group of the remote UE 300 may be notified of the feedback information. The distances between the relay UE 200 and the plurality of pieces of remote UE 300 are predicted to be substantially equal, and the same feedback information can be used for each piece of remote UE 300 included in the group. Note that, for example, the PDCCH or the PMCH can be used to notify the feedback information.

The relay UE 200 or the base station 100 may be notified of information regarding whether the remote UE 300 has sidelink reception capability (SL RX capability) or information indicating that the use of the sidelink reception capability is limited (for example, shared by Uu and DL). The base station 100 and the relay UE 200 may carry out the unidirectional relay operation based on the information.

The capability information may be classified into, for example, "SL Dedicated capability," "SL Shared capability," "Non SL Rx capability," and the like. Here, the "SL Dedicated capability" indicates that the remote UE 300 has dedicated sidelink reception capability. In addition, the "SL Shared capability" indicates that the remote UE 300 has shared sidelink reception capability. In addition, the "Non SL Rx capability" indicates that the remote UE 300 does not have sidelink reception capability.

In addition, the information regarding the sidelink reception capability (SL RX capability) may be provided as terminal capability (UE capability).

In addition, the remote UE 300 may notify the base station 100 of the sidelink reception capability (SL RX capability) information upon Attach. In addition, the remote UE 300 may notify the relay UE 200 of the sidelink reception capability (SL RX capability) information through the SCI upon connection to the relay UE 200.

3.3. Evaluation

In this way, the relay UE 200 in the system according to the present embodiment performs the control so that the measurement results are shared by the plurality of pieces of remote UE 300 (in other words, the plurality of pieces of remote UE 300 shares the load of measurement).

On the basis of the configuration, the number of times of measurement performed by the individual pieces of remote UE 300 can be reduced according to the system of the present embodiment. Therefore, the power consumption of each piece of remote UE 300 can be further reduced, and the measurement can be performed more efficiently.

In addition, the relay UE 200 acquires the information regarding the state of communication through the sidelink from at least part of the plurality of pieces of remote UE 300. Furthermore, the relay UE 200 may transmit a response (that is, feedback information) to the acquired information, toward the plurality of pieces of remote UE 300 through the base station 100.

On the basis of the above configuration, the feedback from the relay UE 200 to the remote UE 300 can be realized in a more suitable mode even in the case of unidirectional relay according to the system of the present embodiment.

4. Third Embodiment

Next, a system according to a third embodiment of the present disclosure will be described by focusing on control regarding transmission of a discovery signal for terminal detection between the relay UE 200 and the remote UE 300.

4.1. Technical Problem

Figure 24:
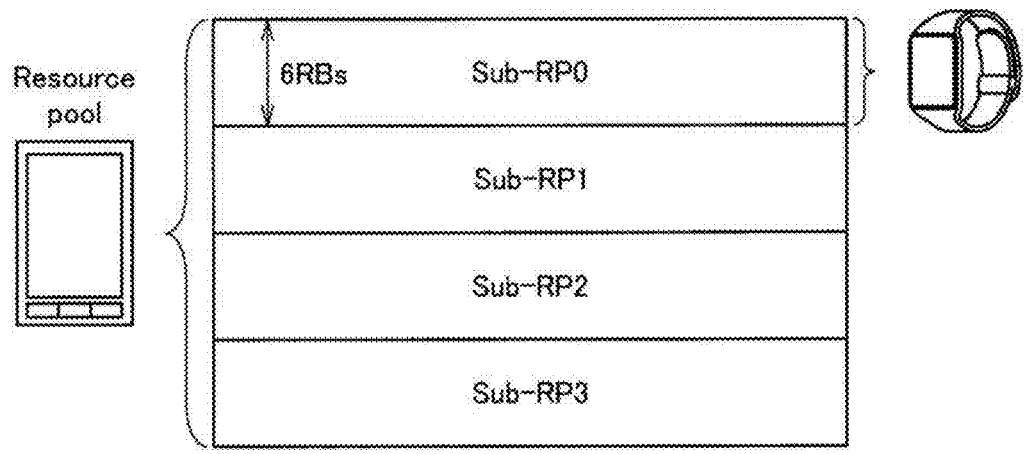
FIG. 24 is an explanatory view for describing an overview of a system according to a third embodiment of the present disclosure.

First, a technical problem of the system according to the present embodiment will be described with reference to FIG. 24. FIG. 24 is an explanatory view for describing an overview of the system according to the present embodiment, and FIG. 24 illustrates an example of a relationship between sub-resource pools and the resource pool allocated to the relay UE 200.

As illustrated in FIG. 24, the remote UE 300 is equivalent to a terminal with limited band, such as an MTC terminal, and for example, the remote UE 300 uses a sub-resource pool with limited band, such as 6PRB, to communicate with the relay UE 200. On the other hand, the band limitation is not applied to the relay UE 200, and the relay UE 200 can use a plurality of sub-resource pools.

Due to the limitation, the number of sub-resource pools that can be monitored by the remote UE 300 is limited to one. Therefore, there is a case where, for example, the relay UE 200 needs to transmit discovery signals to all of the sub-resource pools managed by the relay UE 200 according to the situation. However, the discovery signals are also transmitted to the sub-resource pools not monitored by the remote UE 300 in this method, and the use of resources may be wasted.

Furthermore, in another example, there can be a method in which the base station 100 coordinates the relay UE 200 and the remote UE 300 to perform control to monitor the sub-resource pools in which the discovery signals are transmitted. However, there may be a problem of overhead of control in the method.

In view of the circumstances, a mechanism that realizes more efficient transmission and reception of discovery signals is desirable.

4.2. Technical Features

To realize more efficient transmission and reception of discovery signals, the present embodiment proposes a system of selectively switching a method in which the relay UE 200 transmits discovery signals to a plurality of sub-resource pools and a method in which the base station 100 coordinates the transmission of the discovery signals.

Specifically, the coordination by the base station 100 can be anticipated in an in-coverage area, and efficient transmission and reception of the discovery signals can be realized. On the other hand, it is difficult to anticipate the coordination by the base station 100 in an out-of-coverage area. Therefore, in the out-of-coverage area, the relay UE 300 transmits the discovery signals to a plurality of sub-resource pools (for example, all of the sub-resource pools managed by the relay UE 300) to allow receiving the discovery signals regardless of the sub-resource pool monitored by the remote UE 300.

Note that in the present description, the coordination denotes that the base station 100 notifies the relay UE 200 and the remote UE 300 of the sub-resource pools in which the discovery signals are to be transmitted. Note that in the present description, a reference sub-resource pool in which the discovery signal is to be transmitted based on the coordination by the base station 100 will also be referred to as a "discovery anchor resource pool."

Figure 25:
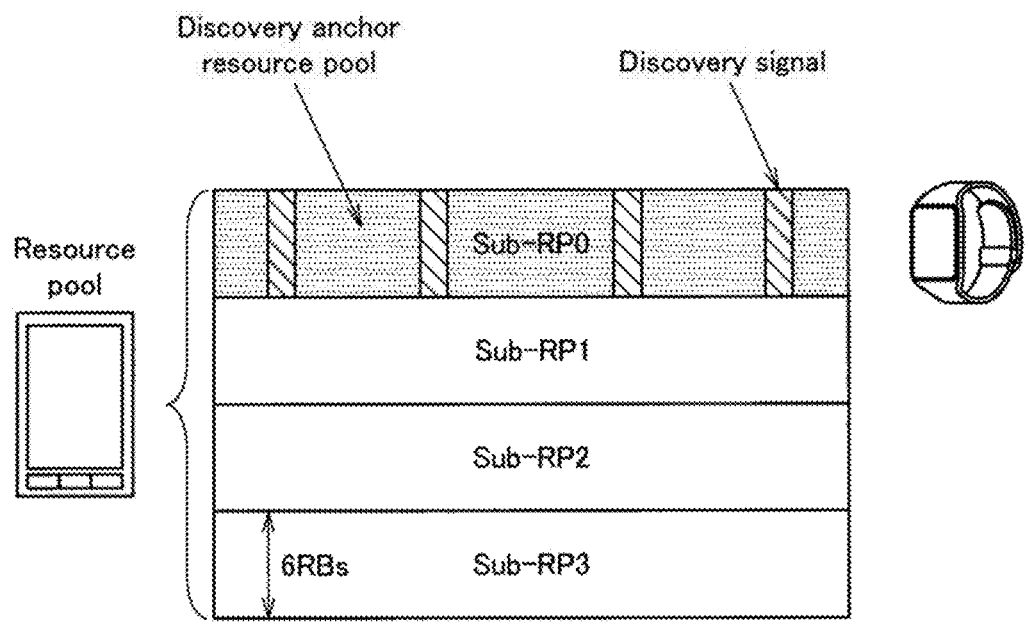
FIG. 25 is an explanatory view for describing an overview of the system according to the third embodiment.

For example, FIG. 25 is an explanatory view for describing an overview of the system according to the present embodiment, and FIG. 25 illustrates an example of a configuration of the discovery anchor resource pool. That is, the sub-resource pool Sub-RP0 is set as a discovery anchor resource pool in the example illustrated in FIG. 25. In this way, the discovery anchor resource pool is set based on the coordination by the base station 100, and the discovery signals are transmitted and received through a predetermined sub-resource pool. Therefore, the relay UE 200 does not have to transmit the discovery signals to the other sub-resource pools.

The RSRP of the downlink signal from the base station 100 is used for the switch, for example. The relay UE 200 requests the base station 100 to carry out the discovery based on the coordination (eNB coordination) by the base station 100 if the measurement result of the RSRP in the downlink is equal to or greater than a threshold. On the other hand, the relay UE 200 notifies the base station 100 that the coordination is not necessary if the measurement result of the RSRP is equal to or smaller than the threshold. The relay UE 200 transmits the discovery signals to all of the sub-resource pools in which the discovery signals can be transmitted, among the sub-resource pools included in the allocated resource pool.

Furthermore, in another example, the relay UE 200 may notify the base station 100 of the measurement result of the RSRP in the downlink. In this case, for example, the base station 100 may determine whether to perform the coordination based on the information notified from the relay UE 200.

In addition, the base station 100 may notify the relay UE 200 of the threshold, and the relay UE 200 may be preconfigured.

Figure 26:
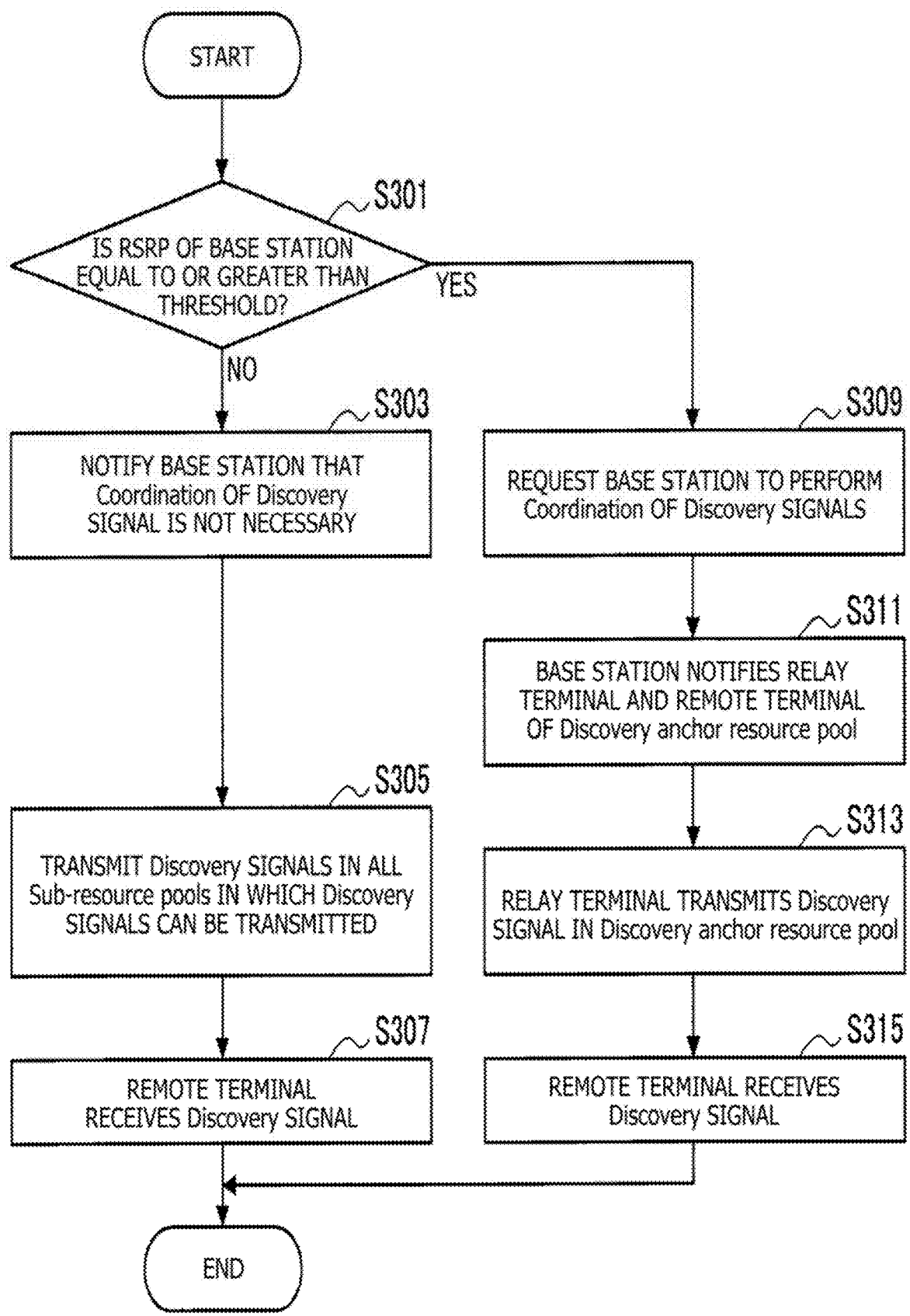
FIG. 26 is a flow chart illustrating an example of a flow of a series of processes of the system according to the third embodiment.

For example, FIG. 26 is a flow chart illustrating an example of a flow of a series of processes of the system according to the present embodiment, and FIG. 26 illustrates an example of a flow of the process regarding the switch.

Specifically, in the case where the RSRP in the downlink communication between the base station 100 and the relay UE 200 is equal to or greater than the threshold (S301, YES), the relay UE 200 (communication control unit 243) requests the base station 100 to coordinate the discovery signals (S309). In response to the request, the base station 100 (communication control unit 153) notifies the relay UE 200 and the remote UE 300 of the discovery anchor resource pool (S311). The relay UE 200 (communication control unit 243) transmits the discovery signal to the discovery anchor resource pool based on the notification from the base station 100 (S313). The remote UE 300 (communication control unit 343) monitors the discovery anchor resource pool to receive the discovery signal based on the notification from the base station 100 (S315).

Furthermore, in the case where the RSRP in the downlink communication between the base station 100 and the relay UE 200 is smaller than the threshold (S301, NO), the relay UE 200 (communication control unit 243) notifies the base station 100 that the coordination of the discovery signals is not necessary (S303). In addition, the relay UE 200 (communication control unit 243) transmits the discovery signals to all of the sub-resource pools in which the discovery signals can be transmitted (S305). The remote UE 300 (communication control unit 343) monitors a desired sub-resource pool to receive the discovery signal (S307).

An example of the flow of the series of process of the system according to the present embodiment has been described with reference to FIG. 26.

4.3. Evaluation

In this way, the relay UE 200 in the system according to the present embodiment acquires the information (for example, RSRP) regarding the state of the downlink between the relay UE 200 and the base station 100 and performs control to transmit the discovery signals to the remote UE 300 through the sub-resource pool according to the acquired information. More specifically, the relay UE 200 requests the base station 100 to coordinate the discovery signals in the case where the RSRP is equal to or greater than the threshold. In this case, the relay UE 200 transmits the discovery signals to the sub-resource pool designated by the base station (that is, discovery anchor resource pool). Furthermore, in the case where the RSRP is smaller than the threshold (for example, in the case where the communication with the base station 100 is limited), the relay UE 200 transmits the discovery signals to all of the sub-resource pools in which the discovery signals can be transmitted, among the sub-resource pools allocated to the sidelink.

In this way, in the system according to the present embodiment, the method in which the relay UE 200 transmits the discovery signals to the plurality of sub-resource pools and the method in which the base station 100 coordinates the transmission of the discovery signals are selectively switched according to the situation. On the basis of the configuration, more efficient transmission and reception of the discovery signals can be realized according to the system of the present embodiment.

5. Application Examples

The technique according to the present disclosure can be applied to various products. For example, the base station 100 may be realized as one of the types of eNB (evolved Node B), such as a macro eNB and a small eNB. The small eNB may be an eNB, such as a pico eNB, a micro eNB, and a home (femto) eNB, that covers a cell smaller than the macro cell. Instead of this, the base station 100 may be realized as another type of base station, such as a NodeB and a BTS (Base Transceiver Station). The base station 100 may include a main body (also referred to as base station apparatus) that controls wireless communication and one or more RRHs (Remote Radio Heads) deployed at places different from the main body. In addition, various types of terminals described later may temporarily or almost permanently execute base station functions to operate as the base station 100.

In addition, for example, the terminal apparatus 200 or 300 may be realized as a mobile terminal, such as a smartphone, a tablet PC (Personal Computer), a notebook PC, a portable game terminal, a portable/dongle mobile router, and a digital camera, or may be realized as an in-vehicle terminal, such as a car navigation apparatus. In addition, the terminal apparatus 200 or 300 may be realized as a terminal (also referred to as MTC (Machine Type Communication) terminal) that performs M2M (Machine to Machine) communication. Furthermore, the terminal apparatus 200 or 300 may be a wireless communication module mounted on these terminals (for example, integrated circuit module including one die).

5.1. Application Examples Regarding Base Station

First Application Example

Figure 27:
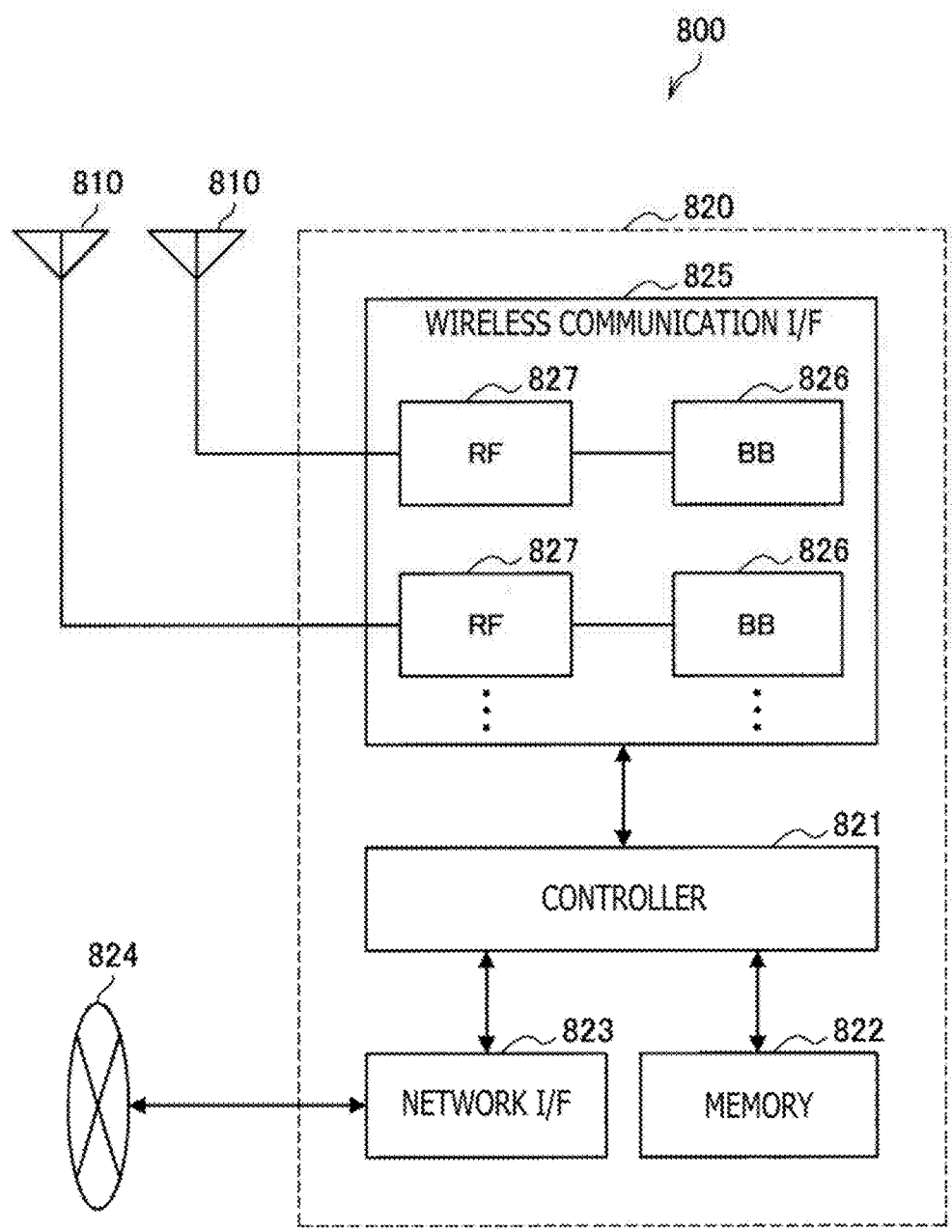
FIG. 27 is a block diagram illustrating a first example of a schematic configuration of an eNB.

FIG. 27 is a block diagram illustrating a first example of a schematic configuration of the eNB in which the technique according to the present disclosure can be applied. An eNB 800 includes one or more antennas 810 and a base station apparatus 820. Each of the antennas 810 and the base station apparatus 820 can be connected to each other through an RF cable.

Each of the antennas 810 includes a single or a plurality of antenna elements (for example, a plurality of antenna elements included in a MIMO antenna), and the antenna 810 is used for wireless signals transmitted and received by the base station apparatus 820. The eNB 800 includes a plurality of antennas 810 as illustrated in FIG. 27, and the plurality of antennas 810 may correspond to, for example, a plurality of frequency bands used by the eNB 800. Note that although the eNB 800 includes a plurality of antennas 810 in the example illustrated in FIG. 27, the eNB 800 may include a single antenna 810.

The base station apparatus 820 includes a controller 821, a memory 822, a network interface 823, and a wireless communication interface 825.

The controller 821 may be, for example, a CPU or a DSP, and the controller 821 operates various functions of upper layers of the base station apparatus 820. For example, the controller 821 generates data packets from data in a signal processed by the wireless communication interface 825 and transfers the generated packets through the network interface 823. The controller 821 may bundle data from a plurality of baseband processors to generate bundled packets and forward the generated bundled packets. In addition, the controller 821 may have logical functions for executing control, such as radio resource control, radio bearer control, mobility management, admission control, and scheduling. In addition, the control may be executed in cooperation with a surrounding eNB or core network node. The memory 822 includes a RAM and a ROM and stores a program executed by the controller 821 and various types of control data (for example, a terminal list, transmission power data, scheduling data, and the like).

The network interface 823 is a communication interface for connecting the base station apparatus 820 to a core network 824. The controller 821 may communicate with a core network node or another eNB through the network interface 823. In that case, the eNB 800 and the core network node or the other eNB may be connected to each other through a logical interface (for example, S1 interface or X2 interface). The network interface 823 may be a wired communication interface or a wireless communication interface for wireless backhaul. In the case where the network interface 823 is a wireless communication interface, the network interface 823 may use a frequency band higher than the frequency band used by the wireless communication interface 825 in the wireless communication.

The wireless communication interface 825 supports a cellular communication system, such as LTE (Long Term Evolution) and LTE-Advanced, and provides wireless connection to terminals positioned in the cell of the eNB 800 through the antenna 810. The wireless communication interface 825 can typically include baseband (BB) processors 826, RF circuits 827, and the like. The BB processor 826 may perform, for example, encoding/decoding, modulation/demodulation, multiplexing/demultiplexing, and the like, and the BB processor 826 executes various types of signal processing of each layer (for example, L1, MAC (Medium Access Control), RLC (Radio Link Control), and PDCP (Packet Data Convergence Protocol)). The BB processor 826 may include part or all of the logical functions in place of the controller 821. The BB processor 826 may be a module including a memory that stores a communication control program, a processor that executes the program, and a related circuit, and the functions of the BB processor 826 may be changed by updating the program. In addition, the module may be a card or a blade inserted into a slot of the base station apparatus 820 or may be a chip mounted on the card or the blade. On the other hand, the RF circuit 827 may include a mixer, a filter, an amplifier, and the like, and the RF circuit 827 transmits and receives wireless signals through the antenna 810.

The wireless communication interface 825 includes a plurality of BB processors 826 as illustrated in FIG. 27, and the plurality of BB processors 826 may correspond to, for example, a plurality of frequency bands used by the eNB 800, respectively. In addition, the wireless communication interface 825 includes a plurality of RF circuits 827 as illustrated in FIG. 27, and the plurality of RF circuits 827 may correspond to, for example, a plurality of antenna elements, respectively. Note that although the wireless communication interface 825 includes a plurality of BB processors 826 and a plurality of RF circuits 827 in the example illustrated in FIG. 27, the wireless communication interface 825 may include a single BB processor 826 or a single RF circuit 827.

In the eNB 800 illustrated in FIG. 27, one or more constituent elements (setting unit 151 and/or communication control unit 153) included in the base station 100 described with reference to FIG. 8 may be implemented in the wireless communication interface 825. Alternatively, at least part of the constituent elements may be implemented in the controller 821. For example, a module including part (for example, BB processor 826) or all of the wireless communication interface 825 and/or the controller 821 may be mounted on the eNB 800, and one or more of the constituent elements may be implemented in the module. In this case, the module may store a program for causing the processor to function as one or more of the constituent elements (in other words, a program for causing the processor to execute the operations of one or more of the constituent elements) and execute the program. In another example, the program for causing the processor to function as one or more of the constituent elements may be installed on the eNB 800, and the wireless communication interface 825 (for example, BB processor 826) and/or the controller 821 may execute the program. In this way, the eNB 800, the base station apparatus 820, or the module may be provided as an apparatus including one or more of the constituent elements, and the program for causing the processor to function as one or more of the constituent elements may be provided. In addition, a readable recording medium recording the program may also be provided.

In addition, in the eNB 800 illustrated in FIG. 27, the wireless communication unit 120 described with reference to FIG. 8 may be implemented in the wireless communication interface 825 (for example, RF circuit 827). In addition, the antenna unit 110 may be implemented in the antenna 810. In addition, the network communication unit 130 may be implemented in the controller 821 and/or the network interface 823. In addition, the storage unit 140 may be implemented in the memory 822.

Second Application Example

Figure 28:
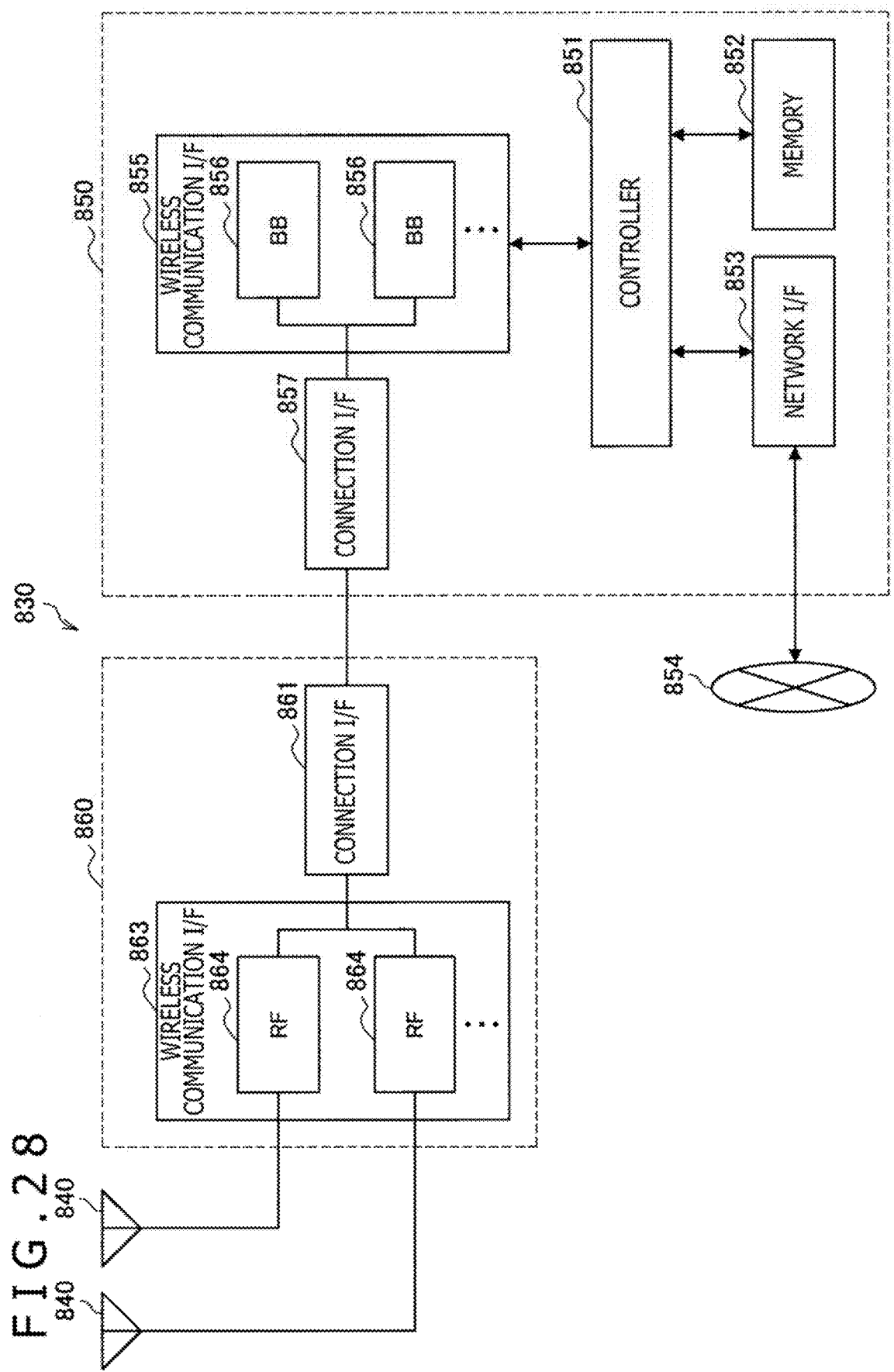
FIG. 28 is a block diagram illustrating a second example of the schematic configuration of the eNB.

FIG. 28 is a block diagram illustrating a second example of the schematic configuration of the eNB in which the technique according to the present disclosure can be applied. An eNB 830 includes one or more antennas 840, a base station apparatus 850, and an RRH 860. Each of the antennas 840 and the RRH 860 can be connected to each other through an RF cable. In addition, the base station apparatus 850 and the RRH 860 can be connected to each other through a high-speed line such as an optical fiber cable.

Each of the antennas 840 includes a single or a plurality of antenna elements (for example, a plurality of antenna elements included in a MIMO antenna), and the antenna 840 is used for wireless signals transmitted and received by the RRH 860. The eNB 830 includes a plurality of antennas 840 as illustrated in FIG. 28, and the plurality of antennas 840 may correspond to, for example, a plurality of frequency bands used by the eNB 830, respectively. Note that although the eNB 830 includes a plurality of antennas 840 in the example illustrated in FIG. 28, the eNB 830 may include a single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 27.

The wireless communication interface 855 supports a cellular communication system, such as LTE and LTE-Advanced, and provides wireless connection to the terminals positioned in the sector corresponding to the RRH 860 through the RRH 860 and the antenna 840. The wireless communication interface 855 can typically include BB processors 856 and the like. The BB processor 856 is similar to the BB processor 826 described with reference to FIG. 27, except that the BB processor 856 is connected to an RF circuit 864 of the RRH 860 through the connection interface 857. The wireless communication interface 855 includes a plurality of BB processors 856 as illustrated in FIG. 28, and the plurality of BB processors 856 may correspond to, for example, a plurality of frequency bands used by the eNB 830, respectively. Note that although the wireless communication interface 855 includes a plurality of BB processors 856 in the example illustrated in FIG. 28, the wireless communication interface 855 may include a single BB processor 856.

The connection interface 857 is an interface for connecting the base station apparatus 850 (wireless communication interface 855) to the RRH 860. The connection interface 857 may be a communication module for communication through the high-speed line that connects the base station apparatus 850 (wireless communication interface 855) and the RRH 860.

In addition, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication through the high-speed line.

The wireless communication interface 863 transmits and receives wireless signals through the antenna 840. The wireless communication interface 863 can typically include the RF circuits 864 and the like. The RF circuit 864 may include a mixer, a filter, an amplifier, and the like, and the RF circuit 864 transmits and receives wireless signals through the antenna 840. The wireless communication interface 863 includes a plurality of RF circuits 864 as illustrated in FIG. 28, and the plurality of RF circuits 864 may correspond to, for example, a plurality of antenna elements, respectively. Note that although the wireless communication interface 863 includes a plurality of RF circuits 864 in the example illustrated in FIG. 28, the wireless communication interface 863 may include a single RF circuit 864.

In the eNB 830 illustrated in FIG. 28, one or more constituent elements (setting unit 151 and/or communication control unit 153) included in the base station 100 described with reference to FIG. 8 may be implemented in the wireless communication interface 855 and/or the wireless communication interface 863. Alternatively, at least part of the constituent elements may be implemented in the controller 851. For example, a module including part (for example, BB processor 856) or all of the wireless communication interface 855 and/or the controller 851 may be mounted on the eNB 830, and one or more of the constituent elements may be implemented in the module. In this case, the module may store a program for causing the processor to function as one or more of the constituent elements (in other words, a program for causing the processor to execute operations of one or more of the constituent elements) and execute the program. In another example, a program for causing the processor to function as one or more of the constituent elements may be installed on the eNB 830, and the wireless communication interface 855 (for example, BB processor 856) and/or the controller 851 may execute the program. In this way, the eNB 830, the base station apparatus 850, or the module may be provided as an apparatus including one or more of the constituent elements, and the program for causing the processor to function as one or more of the constituent elements may be provided. In addition, a readable recording medium recording the program may also be provided.

Furthermore, in the eNB 830 illustrated in FIG. 28, the wireless communication unit 120 described with reference to FIG. 8 may be implemented in, for example, the wireless communication interface 863 (for example, RF circuit 864). In addition, the antenna unit 110 may be implemented in the antenna 840. In addition, the network communication unit 130 may be implemented in the controller 851 and/or the network interface 853. In addition, the storage unit 140 may be implemented in the memory 852.

5.2. Application Example Regarding Terminal Apparatus

First Application Example

Figure 29:
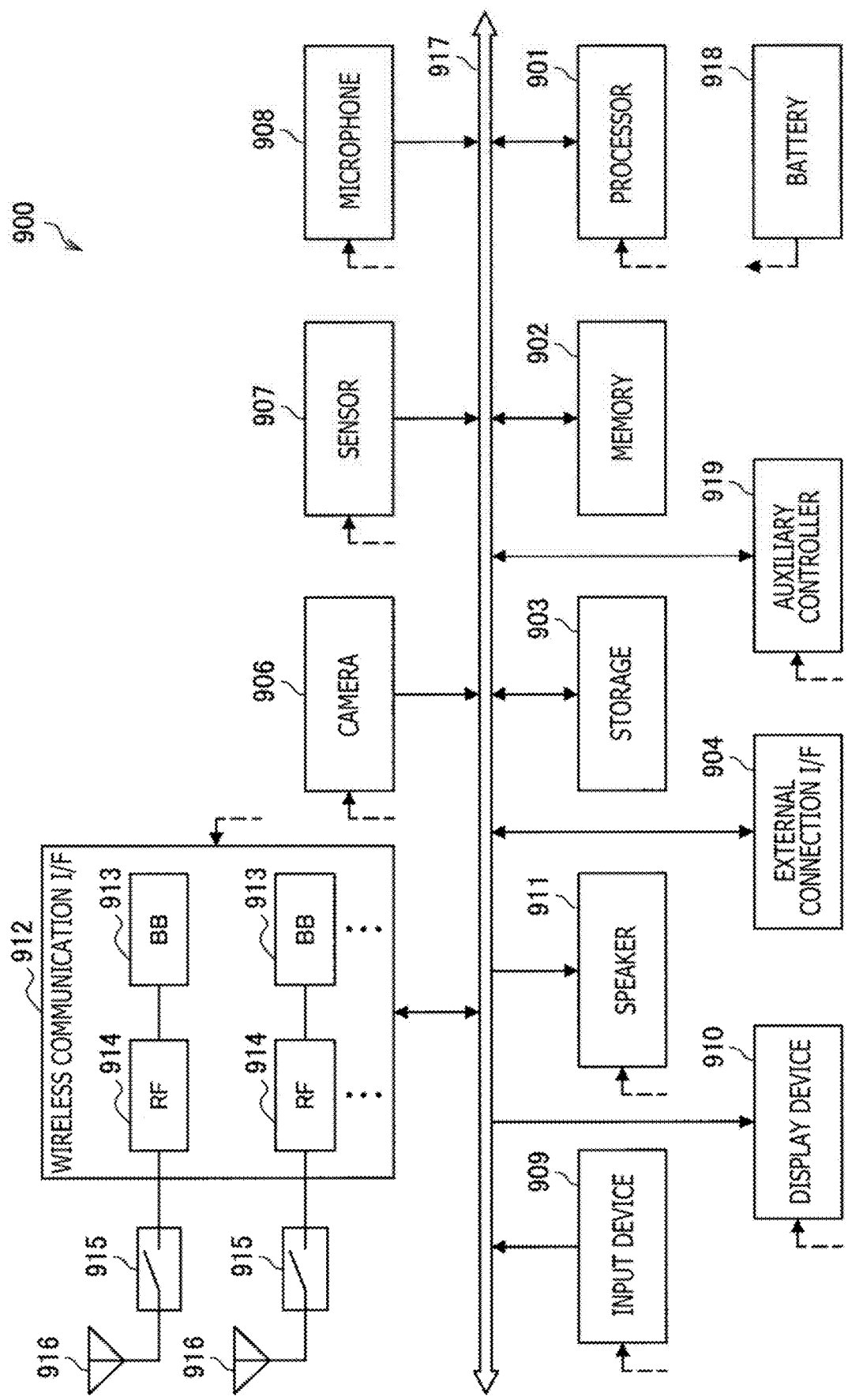
FIG. 29 is a block diagram illustrating an example of a schematic configuration of a smartphone.

FIG. 29 is a block diagram illustrating an example of a schematic configuration of a smartphone 900 in which the technique according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or an SoC (System on Chip), and the processor 901 controls functions of an application layer of the smartphone 900 and other layers. The memory 902 includes a RAM and a ROM and stores a program executed by the processor 901 and data. The storage 903 can include a storage medium such as a semiconductor memory and a hard disk. The external connection interface 904 is an interface for connecting an external device, such as a memory card and a USB (Universal Serial Bus) device, to the smartphone 900.

The camera 906 includes, for example, an imaging element, such as a CCD (Charge Coupled Device) and a CMOS (Complementary Metal Oxide Semiconductor), and generates a captured image. The sensor 907 can include, for example, a sensor group, such as a positioning sensor, a gyrosensor, a geomagnetic sensor, and an acceleration sensor. The microphone 908 converts sound input to the smartphone 900 into a sound signal. The input device 909 includes, for example, a touch sensor that detects a touch of a screen of the display device 910, a keypad, a keyboard, a button, a switch, or the like and receives input of operation or information from the user. The display device 910 includes a screen, such as a liquid crystal display (LCD) and an organic light emitting diode (OLED) display, and displays an output image of the smartphone 900. The speaker 911 converts a sound signal output from the smartphone 900 into sound.

The wireless communication interface 912 supports a cellular communication system, such as LTE and LTE-Advanced, and executes wireless communication. The wireless communication interface 912 can typically include BB processors 913, RF circuits 914, and the like. The BB processor 913 may perform, for example, encoding/decoding, modulation/demodulation, multiplexing/demultiplexing, and the like, and the BB processor 913 executes various types of signal processing for wireless communication. On the other hand, the RF circuit 914 may include a mixer, a filter, an amplifier, and the like, and the RF circuit 914 transmits and receives wireless signals through the antenna 916. The wireless communication interface 912 may be a one-chip module in which the BB processors 913 and the RF circuits 914 are integrated. The wireless communication interface 912 may include a plurality of BB processors 913 and a plurality of RF circuits 914 as illustrated in FIG. 29. Note that although the wireless communication interface 912 includes a plurality of BB processors 913 and a plurality of RF circuits 914 in the example illustrated in FIG. 29, the wireless communication interface 912 may include a single BB processor 913 or a single RF circuit 914.

Furthermore, the wireless communication interface 912 may also support other types of wireless communication systems, such as a short-range wireless communication system, a near-field wireless communication system, and a wireless LAN (Local Area Network) system, in addition to the cellular communication system, and in that case, the wireless communication interface 912 may include the BB processor 913 and the RF circuit 914 for each wireless communication system.

Each of the antenna switches 915 switches the destinations of the antenna 916 between a plurality of circuits (for example, circuits for different wireless communication systems) included in the wireless communication interface 912.

Each of the antennas 916 includes a single or a plurality of antenna elements (for example, a plurality of antenna elements included in a MIMO antenna) and is used for wireless signals transmitted and received by the wireless communication interface 912. The smartphone 900 may include a plurality of antennas 916 as illustrated in FIG. 29. Note that although the smartphone 900 includes a plurality of antennas 916 in the example illustrated in FIG. 29, the smartphone 900 may include a single antenna 916.

Furthermore, the smartphone 900 may include the antenna 916 for each wireless communication system. In that case, the antenna switch 915 may be removed from the configuration of the smartphone 900.

The bus 917 mutually connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919. The battery 918 supplies power to each block of the smartphone 900 illustrated in FIG. 29 through power lines partially indicated by dotted lines in FIG. 29. The auxiliary controller 919 causes the smartphone 900 to operate minimum required functions in, for example, a sleep mode.

In the smartphone 900 illustrated in FIG. 29, one or more constituent elements (measurement processing unit 241 and/or communication control unit 243) included in the relay UE 200 described with reference to FIG. 9 or one or more constituent elements (measurement processing unit 341 and/ or communication control unit 343) included in the remote UE 300 described with reference to FIG. 10 may be implemented in the wireless communication interface 912. Alternatively, at least part of the constituent elements may be implemented in the processor 901 or the auxiliary controller 919. For example, a module including a part (for example, BB processor 913) or all of the wireless communication interface 912, the processor 901, and/or the auxiliary controller 919 may be mounted on the smartphone 900, and one or more of the constituent elements may be implemented in the module. In this case, the module may store a program for causing the processor to function as one or more of the constituent elements (in other words, a program for causing the processor to execute the operations of one or more of the constituent elements) and execute the program. In another example, a program for causing the processor to function as one or more of the constituent elements may be installed on the smartphone 900, and the wireless communication interface 912 (for example, BB processor 913), the processor 901, and/or the auxiliary controller 919 may execute the program. In this way, the smartphone 900 or the module may be provided as an apparatus including one or more of the constituent elements, and the program for causing the processor to function as one or more of the constituent elements may be provided. In addition, a readable recording medium recording the program may also be provided.

Furthermore, in the smartphone 900 illustrated in FIG. 29, the wireless communication unit 220 described with reference to FIG. 9 or the wireless communication unit 320 described with reference to FIG. 10 may be implemented in, for example, the wireless communication interface 912 (for example, RF circuit 914). In addition, the antenna unit 210 or the antenna unit 310 may be implemented in the antenna 916. In addition, the storage unit 230 or the storage unit 330 may be implemented in the memory 902.

Second Application Example

Figure 30:
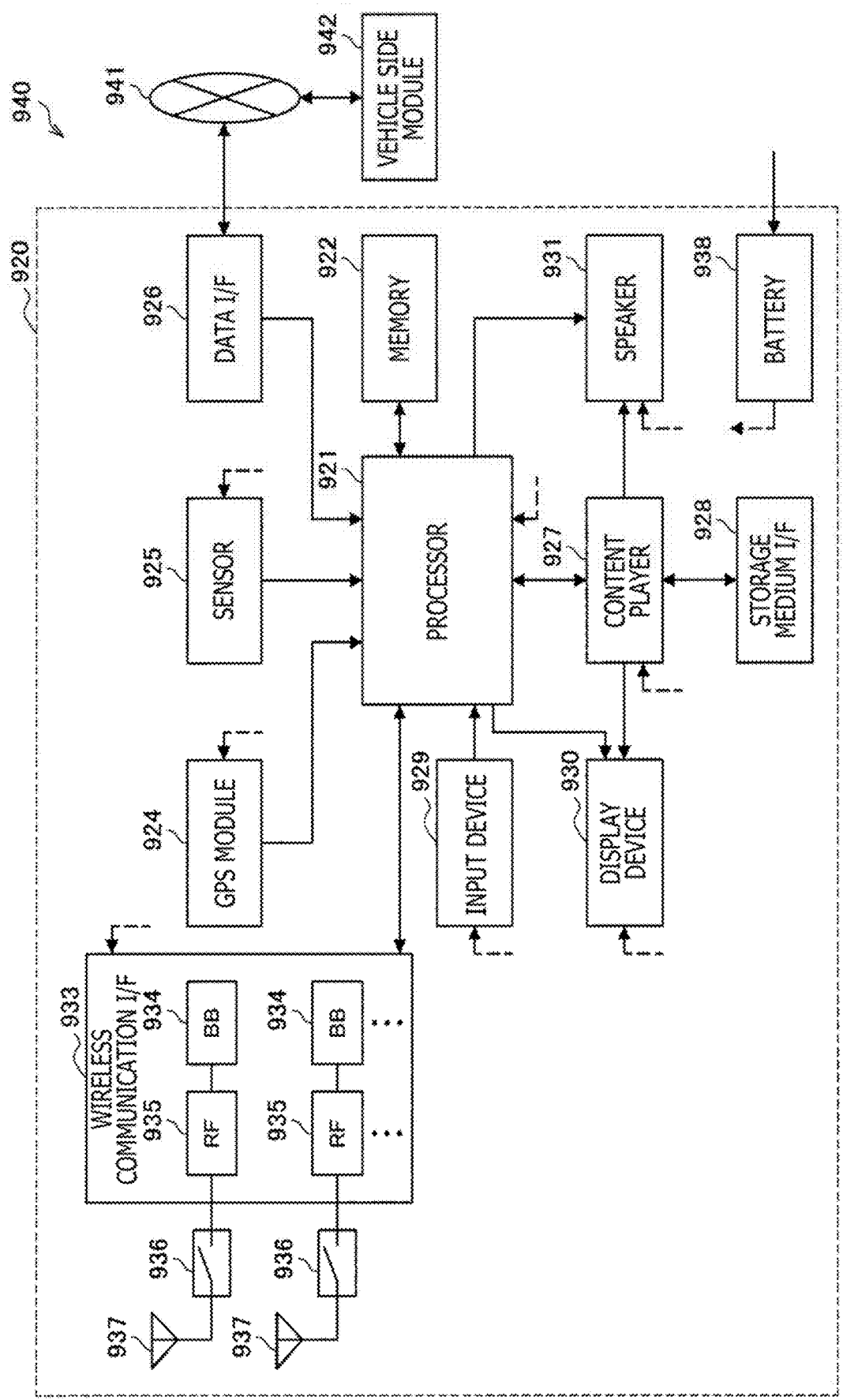
FIG. 30 is a block diagram illustrating an example of a schematic configuration of a car navigation apparatus.

FIG. 30 is a block diagram illustrating an example of a schematic configuration of a car navigation apparatus 920 in which the technique according to the present disclosure can be applied. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and the processor 921 controls navigation functions of the car navigation apparatus 920 and other functions. The memory 922 includes a RAM and a ROM and stores a program executed by the processor 921 and data.

The GPS module 924 uses a GPS signal received from a GPS satellite to measure the position (for example, latitude, longitude, and altitude) of the car navigation apparatus 920. The sensor 925 can include, for example, a sensor group, such as a gyrosensor, a geomagnetic sensor, and a pressure sensor. The data interface 926 is connected to, for example, an in-vehicle network 941 through a terminal not illustrated, and the data interface 926 acquires data, such as speed data, generated on the vehicle side.

The content player 927 reproduces content stored in a storage medium (for example, CD or DVD) inserted into the storage medium interface 928. The input device 929 includes, for example, a touch sensor that detects a touch on the screen of the display device 930, a button, a switch, or the like, and receives input of operation or information from the user. The display device 930 includes a screen, such as an LCD or OLED display, and displays images of navigation functions or content to be reproduced. The speaker 931 outputs sound of navigation functions or content to be reproduced.

The wireless communication interface 933 supports a cellular communication system, such as LTE and LTE-Advanced, and executes wireless communication. The wireless communication interface 933 can typically include BB processors 934, RF circuits 935, and the like. The BB processor 934 may perform, for example, encoding/decoding, modulation/demodulation, multiplexing/demultiplexing, and the like, and the BB processor 934 executes various types of signal processing for wireless communication. On the other hand, the RF circuit 935 may include a mixer, a filter, an amplifier, and the like, and the RF circuit 935 transmits and receives wireless signals through the antenna 937. The wireless communication interface 933 may be a one-chip module in which the BB processors 934 and the RF circuits 935 are integrated. The wireless communication interface 933 may include a plurality of BB processors 934 and a plurality of RF circuits 935 as illustrated in FIG. 30. Note that although the wireless communication interface 933 includes a plurality of BB processors 934 and a plurality of RF circuits 935 in the example illustrated in FIG. 30, the wireless communication interface 933 may include a single BB processor 934 or a single RF circuit 935.

Furthermore, the wireless communication interface 933 may also support other types of wireless communication systems, such as a short-range wireless communication system, a near-field wireless communication system, and a wireless LAN system, in addition to the cellular communication system, and in that case, the wireless communication interface 933 may include the BB processor 934 and the RF circuit 935 for each wireless communication system.

Each of the antenna switches 936 switches the destinations of the antenna 937 between a plurality of circuits (for example, circuits for different wireless communication systems) included in the wireless communication interface 933.

Each of the antennas 937 includes a single or a plurality of antenna elements (for example, a plurality of antenna elements included in a MIMO antenna), and the antenna 937 is used for wireless signals transmitted and received by the wireless communication interface 933. The car navigation apparatus 920 may include a plurality of antennas 937 as illustrated in FIG. 30. Note that although the car navigation apparatus 920 includes a plurality of antennas 937 in the example illustrated in FIG. 30, the car navigation apparatus 920 may include a single antenna 937.

Furthermore, the car navigation apparatus 920 may include the antenna 937 for each wireless communication system. In that case, the antenna switch 936 may be removed from the configuration of the car navigation apparatus 920.

The battery 938 supplies power to each block of the car navigation apparatus 920 illustrated in FIG. 30 through power lines partially indicated by dotted lines in FIG. 30. In addition, the battery 938 stores power supplied from the vehicle side.

In the car navigation apparatus 920 illustrated in FIG. 30, one or more constituent elements (measurement processing unit 241 and/or communication control unit 243) included in the relay UE 200 described with reference to FIG. 9 or one or more constituent elements (measurement processing unit 341 and/or communication control unit 343) included in the remote UE 300 described with reference to FIG. 10 may be implemented in the wireless communication interface 933.

Alternatively, at least part of the constituent elements may be implemented in the processor 921. For example, a module including part (for example, BB processor 934) or all of the wireless communication interface 933 and/or the processor 921 may be mounted on the car navigation apparatus 920, and one or more of the constituent elements may be implemented in the module. In this case, the module may store a program for causing the processor to function as one or more of the constituent elements (in other words, a program for causing the processor to execute operations of one or more of the constituent elements) and execute the program. In another example, the program for causing the processor to function as one or more of the constituent elements may be installed on the car navigation apparatus 920, and the wireless communication interface 933 (for example, BB processor 934) and/or the processor 921 may execute the program. In this way, the car navigation apparatus 920 or the module may be provided as an apparatus including one or more of the constituent elements, and the program for causing the processor to function as one or more of the constituent elements may be provided. In addition, a readable recording medium recording the program may also be provided.

Furthermore, in the car navigation apparatus 920 illustrated in FIG. 30, the wireless communication unit 220 described with reference to FIG. 9 or the wireless communication unit 320 described with reference to FIG. 10 may be implemented in, for example, the wireless communication interface 933 (for example, RF circuit 935). In addition, the antenna unit 210 or the antenna unit 310 may be implemented in the antenna 937. In addition, the storage unit 230 or the storage unit 330 may be implemented in the memory 922.

In addition, the technique according to the present disclosure may be realized as an in-vehicle system (or vehicle) 940 including one or more of the blocks of the car navigation apparatus 920, the in-vehicle network 941, and a vehicle side module 942. The vehicle side module 942 generates vehicle side data, such as vehicle speed, engine speed, and malfunction information, and outputs the generated data to the in-vehicle network 941.

6. Conclusion

Although the preferred embodiments of the present disclosure have been described in detail with reference to the attached drawings, the technical scope of the present disclosure is not limited to the example. It is apparent that a person with normal knowledge in the technical field of the present disclosure can conceive various changes or modifications within the technical idea described in the claims, and it is understood that they obviously belong to the technical scope of the present disclosure.

In addition, the advantageous effects described in the present specification are explanatory or exemplary only and not limiting. That is, in addition to or in place of the advantageous effects, the technique according to the present disclosure can attain other advantageous effects apparent to those skilled in the art from the description of the present specification.

Note that the following configuration also belongs to the technical scope of the present disclosure.

(1)

A communication apparatus including:
an acquisition unit that acquires, from another apparatus, information regarding a state of communication through a resource pool allocated to wireless links between at least part of a plurality of relay communication apparatuses, which are movable, and a remote communication apparatus; and
a control unit that individually controls allocation of the resource pool to each of the wireless links between each of the plurality of relay communication apparatuses and the remote communication apparatus associated with the relay communication apparatus on the basis of the acquired information.

(2)

The communication apparatus according to (1), in which the information acquired from the other apparatus includes information according to a measurement result of a predetermined state regarding the wireless link.

(3)

The communication apparatus according to (2), in which the information according to the measurement result includes information regarding influence of wireless signals between a plurality of the sub-resource pools that are allocated to the wireless links and that are adjacent to each other in a frequency direction.

(4)

The communication apparatus according to any one of (1) to (3), in which
the information is notified on the basis of predetermined signaling.

(5)

The communication apparatus according to any one of (1) to (4), further including:
a notification unit that notifies the other information of second information according to setting regarding acquisition of first information that is the information.

(6)

The communication apparatus according to (5), in which the second information includes information regarding at least one of the relay communication apparatus or the remote communication apparatus as an acquisition target of the first information.

(7)

The communication apparatus according to (5) or (6), in which
the second information includes information regarding at least one of the resource pool or at least part of sub-resource pools included in the resource pool as an acquisition target of the first information.

(8)

The communication apparatus according to any one of (1) to (7), in which
the other apparatus is the relay communication apparatus or the remote communication apparatus.

(9)

The communication apparatus according to any one of (1) to (8), in which
the other apparatus is another relay communication apparatus different from the relay communication apparatus or another remote communication apparatus different from the remote communication apparatus.

(10)

A communication apparatus including:
a notification unit that notifies a base station of information regarding a state of communication through a resource pool allocated to a wireless link to a remote communication apparatus; and
a control unit that controls communication through the wireless link to the remote communication apparatus on the basis of a resource pool allocated to the wireless link by the base station after the notification of the information, the resource pool allocated separately from another wireless link between another relay communication apparatus and another remote communication apparatus.

(11)
The communication apparatus according to (10), in which the control unit allocates a resource for the communication with the remote communication apparatus from the resource pool separately allocated to the wireless link to the remote communication apparatus by the base station.

(12)
The communication apparatus according to (10) or (11), in which
the notification unit notifies the base station of the information according to a state of communication through at least part of one or more sub-resource pools included in the resource pool allocated to the wireless link to the remote communication apparatus.

(13)
The communication apparatus according to (12), in which
the information includes information according to a measurement result of a predetermined state regarding the wireless link, and
the notification unit notifies the base station of the information according to a comparison result of the measurement result of at least part of the one or more sub-resource pools included in the resource pool and a threshold.

(14)
A communication apparatus which is movable, the communication apparatus including:
a control unit that relays communication between at least part of a plurality of remote communication apparatuses and a base station;
an acquisition unit that acquires, from at least part of the plurality of remote communication apparatuses, information regarding states of communication with the remote communication apparatuses through wireless links; and
a notification unit that notifies, through the base station, the plurality of remote communication apparatuses of a response according to an acquisition result of the information.

(15)
The communication apparatus according to (14), in which
the notification unit notifies, through the base station, the plurality of remote communication apparatuses of the response according to capability regarding the communication with at least part of the plurality of remote communication apparatuses through the wireless links.

(16)
The communication apparatus according to (14) or (15), in which
the notification unit notifies a group including the plurality of remote communication apparatuses of the response.

(17)
A communication apparatus including:
a notification unit that notifies a relay communication apparatus, which is movable, of information regarding a state of communication through a wireless link to the relay communication apparatus; and
an acquisition unit that acquires, through a base station, a response to the information transmitted by the relay communication apparatus to a plurality of remote communication apparatuses associated with the relay communication apparatus.

(18)
A communication apparatus which is movable, the communication apparatus including:
a control unit that relays communication between a remote communication apparatus and a base station; and
a state acquisition unit that acquires information regarding a state of a first wireless link to the base station, in which
the control unit performs control to transmit a discovery signal to the remote communication apparatus through at least part of a plurality of sub-resource pools allocated to a second wireless link to the remote communication apparatus according to the acquired information.

(19)
The communication apparatus according to (18), in which
the control unit performs control to transmit the discovery signal to the remote communication apparatus through all of the plurality of sub-resource pools allocated to the second wireless link in a case where communication through the first wireless link is limited.

(20)
The communication apparatus according to (18), in which
the control unit performs control to transmit the discovery signal to the remote communication apparatus through the sub-resource pool designated by the base station in a case where the communication through the first wireless link is established.

(21)
The communication apparatus according to any one of (18) to (20), in which
the information includes information according to a measurement result of received power of a wireless signal from the base station through the first wireless link.

(22)
A communication apparatus including:
an acquisition unit that acquires, from a base station, information regarding at least part of a plurality of sub-resource pools allocated to a second wireless link to a relay communication apparatus, which is movable, according to a state of a first wireless link between the relay communication apparatus and the base station; and
a control unit that performs control to receive a discovery signal transmitted from the relay communication apparatus through at least part of the plurality of sub-resource pools according to an acquisition status of the information.

(23)
The communication apparatus according to (22), in which
the control unit performs control to receive the discovery signal through the sub-resource pool according to the information in a case where the information is acquired from the base station.

(24)
A communication method executed by a computer, the communication method including:
acquiring, from another apparatus, information regarding a state of communication through a resource pool allocated to wireless links between at least part of a plurality of relay communication apparatuses, which are movable, and a remote communication apparatus; and individually controlling allocation of the resource pool to each of the wireless links between each of the plurality of relay communication apparatuses and the remote communication apparatus associated with the relay communication apparatus on the basis of the acquired information.

(25)

A communication method executed by a computer, the communication method including:
notifying a base station of information regarding a state of communication through a resource pool allocated to a wireless link to a remote communication apparatus; and
controlling communication through the wireless link to the remote communication apparatus on the basis of a resource pool allocated to the wireless link by the base station after the notification of the information, the resource pool allocated separately from another wireless link between another relay communication apparatus and another remote communication apparatus.

(26)

A communication method executed by a computer which is movable, the communication method including:
relaying communication between at least part of a plurality of remote communication apparatuses and a base station;
acquiring, from at least part of the plurality of remote communication apparatuses, information regarding states of communication with the remote communication apparatuses through wireless links; and
notifying, through the base station, the plurality of remote communication apparatuses of a response according to an acquisition result of the information.

(27)

A communication method executed by a computer, the communication method including:
notifying a relay communication apparatus, which is movable, of information regarding a state of communication through a wireless link to the relay communication apparatus; and
acquiring, through a base station, a response to the information transmitted by the relay communication apparatus to a plurality of remote communication apparatuses associated with the relay communication apparatus.

(28)

A communication method executed by a computer which is movable, the communication method including:
relaying communication between a remote communication apparatus and a base station;
acquiring information regarding a state of a first wireless link to the base station; and
performing control to transmit a discovery signal to the remote communication apparatus through at least part of a plurality of sub-resource pools allocated to a second wireless link to the remote communication apparatus according to the acquired information.

(29)

A communication method executed by a computer, the communication method including:
acquiring, from a base station, information regarding at least part of a plurality of sub-resource pools allocated to a second wireless link to a relay communication apparatus, which is movable, according to a state of a first wireless link between the relay communication apparatus and the base station; and
performing control to receive a discovery signal transmitted from the relay communication apparatus through at least part of the plurality of sub-resource pools according to an acquisition status of the information.

REFERENCE SIGNS LIST

1 System
100 Base station
110 Antenna unit
120 Wireless communication unit
130 Network communication unit
140 Storage unit
150 Control unit
151 Setting unit
153 Communication control unit
200 Relay UE
210 Antenna unit
220 Wireless communication unit
230 Storage unit
240 Control unit
241 Measurement processing unit
243 Communication control unit
300 Remote UE
310 Antenna unit
320 Wireless communication unit
330 Storage unit
340 Control unit
341 Measurement processing unit
343 Communication control unit

The invention claimed is:

1. A first wireless communication device, configured to relay communication between a base station and a one or more second wireless devices having a device-specific bandwidth that is narrower than a bandwidth of the first wireless communication device, the first wireless communication device comprising:
circuitry configured to:
receive, from the base station, first information related to a resource pool that is used by the first wireless communication device for device-to-device (D2D) communications, the resource pool comprising a plurality of sub resource pools that is used by the first wireless communication device for the D2D communications with a specific second wireless device of the one or more second wireless devices having the device-specific bandwidth that is narrower than the bandwidth of the first wireless communication device;
receive, from the base station, second information related to a specific sub resource pool of the plurality of sub resource pools that is used by the first wireless communication device to transmit a discovery signal to the specific second wireless communication device; and
transmit the discovery signal to the specific second wireless communication device using the specific sub resource pool,
wherein the discovery signal is used for terminal detection between the first wireless communication device and the specific second wireless communication device,
wherein the specific sub resource pool is a sub resource pool provided for communication between the first wireless communication device and the specific second wireless communication device according to a limitation on the bandwidth of the specific second wireless communication device, wherein the limitation on the bandwidth of the specific second wireless communication device is less than or equal to 6 resource blocks, and
wherein the circuitry is further configured to:
perform a communication quality measurement of each of the plurality of sub resource pools, and
based on a result of the communication quality measurement, transmit a request to the base station for the base station to identify the specific sub resource pool to both the first wireless communication device and the specific second wireless communication device,
wherein the second information related to the specific sub resource pool for the specific second wireless communication device is received from the base station in response to the request.

2. The first wireless communication device according to claim 1, wherein a measurement item of the communication quality measurement is at least one of a reference signal received power or a reference signal received quality.

3. A method performed by a first wireless communication device that is configured to relay communication between a base station and one or more second wireless devices having a device-specific bandwidth that is narrower than a bandwidth of the first wireless communication device, the method comprising:
receiving, from the base station, first information related to a resource pool that is used by the first wireless communication device for device-to-device (D2D) communications, the resource pool comprising a plurality of sub resource pools that is used by the first wireless communication device for the D2D communications with a specific second wireless device of the one or more second wireless devices having the device-specific bandwidth that is narrower than the bandwidth of the first wireless communication device;
receiving, from the base station, second information related to a specific sub resource pool of the plurality of sub resource pools that is used by the first wireless communication device to transmit a discovery signal to the specific second wireless communication device; and
transmitting the discovery signal to the specific second wireless communication device using the specific sub resource pool,
wherein the discovery signal is used for terminal detection between the first wireless communication device and the specific second wireless communication device,
wherein the specific sub resource pool is a sub resource pool provided for communication between the first wireless communication device and the specific second wireless communication device according to a limitation on the bandwidth of the specific second wireless communication device,
wherein the limitation on the bandwidth of the specific second wireless communication device is less than or equal to 6 resource blocks, and
wherein the method further comprises:
performing a communication quality measurement of each of the plurality of sub resource pools, and
based on a result of the communication quality measurement, transmitting a request to the base station for the base station to identify the specific sub resource pool to both the first wireless communication device and the specific second wireless communication device,
wherein the second information related to the specific sub resource pool for the specific second wireless communication device is received from the base station in response to the request.

4. A non-transitory computer readable medium storing a product containing instructions, which when executed by a processor of a first wireless communication device, cause the first wireless communication device to perform a method, the first wireless communication device being configured to relay communication between a base station and one or more second wireless devices having a device-specific bandwidth that is narrower than a bandwidth of the first wireless communication device, the method comprising:
receiving, from the base station, first information related to a resource pool that is used by the first wireless communication device for device-to-device (D2D) communications, the resource pool comprising a plurality of sub resource pools that is used by the first wireless communication device for the D2D communications with a specific second wireless device of the one or more second wireless devices having the device-specific bandwidth that is narrower than the bandwidth of the first wireless communication device;
receiving, from the base station, second information related to a specific sub resource pool of the plurality of sub resource pools that is used by the first wireless communication device to transmit a discovery signal to the specific second wireless communication device; and
transmitting the discovery signal to the specific second wireless communication device using the specific sub resource pool,
wherein the discovery signal is used for terminal detection between the first wireless communication device and the specific second wireless communication device,
wherein the specific sub resource pool is a sub resource pool provided for communication between the first wireless communication device and the specific second wireless communication device according to a limitation on the bandwidth of the specific second wireless communication device,
wherein the limitation on the bandwidth of the specific second wireless communication device is less than or equal to 6 resource blocks, and
wherein the method further comprises:
performing a communication quality measurement of each of the plurality of sub resource pools, and
based on a result of the communication quality measurement, transmitting a request to the base station for the base station to identify the specific sub resource pool to both the first wireless communication device and the specific second wireless communication device,
wherein the second information related to the specific sub resource pool for the specific second wireless communication device is received from the base station in response to the request.

* * * * *